(12) United States Patent
Sologuren-Sanchez et al.

(10) Patent No.: US 8,848,345 B2
(45) Date of Patent: Sep. 30, 2014

(54) SWITCHGEAR ASSEMBLY MODULE AND SWITCHGEAR ASSEMBLY

(75) Inventors: Diego Sologuren-Sanchez, Wettingen (CH); Tilo Bolli, Merligen (CH); Walter Holaus, Zürich (CH)

(73) Assignee: ABB Technology AG, Zurich (CH)

( * ) Notice: Subject to any disclaimer, the term of this patent is extended or adjusted under 35 U.S.C. 154(b) by 255 days.

(21) Appl. No.: 13/352,825

(22) Filed: Jan. 18, 2012

(65) Prior Publication Data
US 2012/0113568 A1 May 10, 2012

Related U.S. Application Data

(63) Continuation of application No. PCT/EP2010/050514, filed on Jan. 18, 2010.

(51) Int. Cl.
*H02B 1/20* (2006.01)
*H02B 13/045* (2006.01)
*H02B 7/01* (2006.01)
*H02B 13/035* (2006.01)

(52) U.S. Cl.
CPC .......... *H02B 13/0352* (2013.01); *H02B 13/045* (2013.01)
USPC ........... 361/612; 361/604; 361/618; 361/619; 361/624; 361/632; 218/120; 218/154

(58) Field of Classification Search
USPC ........... 361/3, 5, 62, 600–605, 611–624, 637, 361/639; 218/7, 43, 45, 13–15, 152, 156, 218/119, 4; 200/48 A, 48 B, 48 R, 501, 238, 200/293; 307/141–144
See application file for complete search history.

(56) References Cited

U.S. PATENT DOCUMENTS 3,665,135 A 5/1972 Boersma et al.
4,184,058 A * 1/1980 Irik et al. ...................... 200/501
(Continued)

FOREIGN PATENT DOCUMENTS

DE 10 2006 062 540 A1 7/2008
DE 102006062540 A1 * 7/2008 ........... H02B 13/035
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Aug. 16, 2012, issued in corresponding International Application No. PCT/EP2010/050514. (10 pages).
(Continued)

*Primary Examiner* — Michail V Datskovskiy
(74) *Attorney, Agent, or Firm* — Buchanan Ingersoll & Rooney PC

(57) ABSTRACT

A switchgear assembly module has a housing, which forms a common gas space for accommodating an insulating gas for the switchgear assembly module. The switchgear assembly module includes a busbar conductor arrangement having three busbar conductor sections, which are accommodated in the common gas space, an outgoing conductor connection group with three outgoing conductor openings and with three outgoing conductor sections, which extend from within the housing towards a respective one of the outgoing conductor openings, and three switch disconnectors, which each connect a respective one of the busbar conductor sections to a respective one of the outgoing conductor sections via a disconnection point. The disconnection point of a first one of the switch disconnectors is arranged on a first side of an outgoing normal plane and the disconnection point of a second one of the switch disconnectors is arranged on a second side of the outgoing normal plane.

29 Claims, 5 Drawing Sheets

(56) References Cited

U.S. PATENT DOCUMENTS

| | | | | |
|---|---|---|---|---|
| 4,689,717 | A | * | 8/1987 | Munzinger et al. ............ 361/618 |
| 4,747,522 | A | * | 5/1988 | McIntyre ....................... 222/213 |
| 5,003,427 | A | * | 3/1991 | Reichl et al. ................... 361/612 |
| 5,291,369 | A | * | 3/1994 | Kelch et al. .................... 361/605 |
| 5,453,910 | A | * | 9/1995 | Itou et al. ....................... 361/612 |
| 5,991,148 | A | * | 11/1999 | Heil et al. ....................... 361/605 |
| 6,509,522 | B1 | * | 1/2003 | Okabe et al. ..................... 174/28 |
| 7,485,807 | B2 | * | 2/2009 | Dambietz et al. ............ 174/72 B |
| 7,796,374 | B2 | * | 9/2010 | Mori et al. ..................... 361/619 |
| 7,911,770 | B2 | * | 3/2011 | Fujita et al. .................... 361/612 |
| 2006/0245128 | A1 | * | 11/2006 | Dambietz et al. ............... 361/62 |
| 2011/0286153 | A1 | * | 11/2011 | Betz et al. ...................... 361/624 |

FOREIGN PATENT DOCUMENTS

| | | | | |
|---|---|---|---|---|
| EP | 0 204 082 A1 | | 12/1986 | |
| EP | 0 291 762 A2 | | 11/1988 | |
| EP | 000708514 A2 | * | 4/1996 | ........... H02B 13/035 |
| EP | 1 054 493 A1 | | 11/2000 | |
| EP | 1928065 A1 | * | 6/2008 | ........... H02B 13/075 |
| WO | WO 2008/022893 A1 | | 2/2008 | |
| WO | WO 2010/133692 A1 | | 11/2010 | |

OTHER PUBLICATIONS

International Search Report (PCT/ISA/210) issued on Jan. 20, 2011, by European Patent Office as the International Searching Authority for International Application No. PCT/EP2010/050514.

Written Opinion (PCT/ISA/237) issued on Jan. 20, 2011, by European Patent Office as the International Searching Authority for International Application No. PCT/EP2010/050514.

* cited by examiner

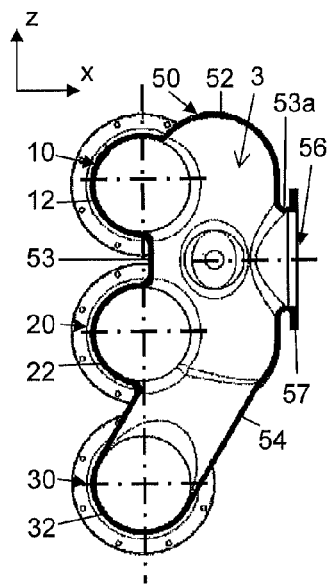
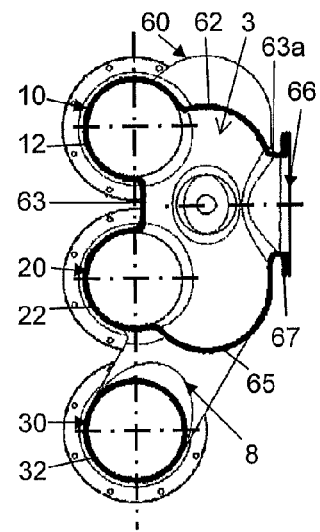
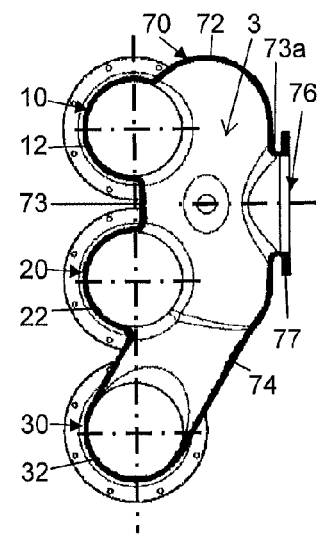
FIG. 3a  FIG. 3b  FIG. 3c
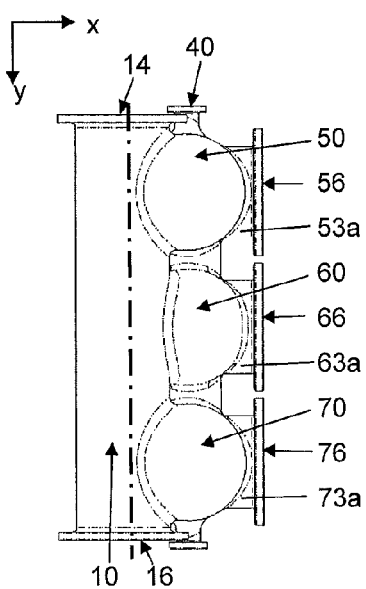
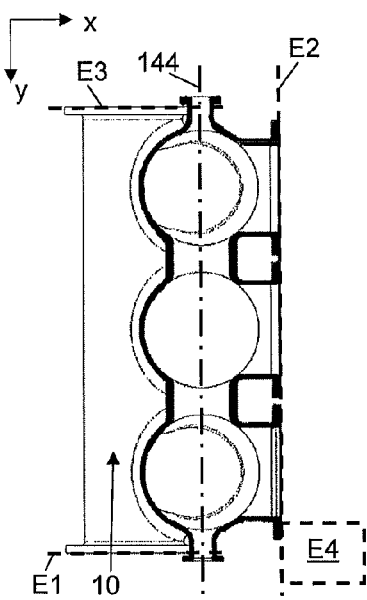
FIG. 4a  FIG. 4b

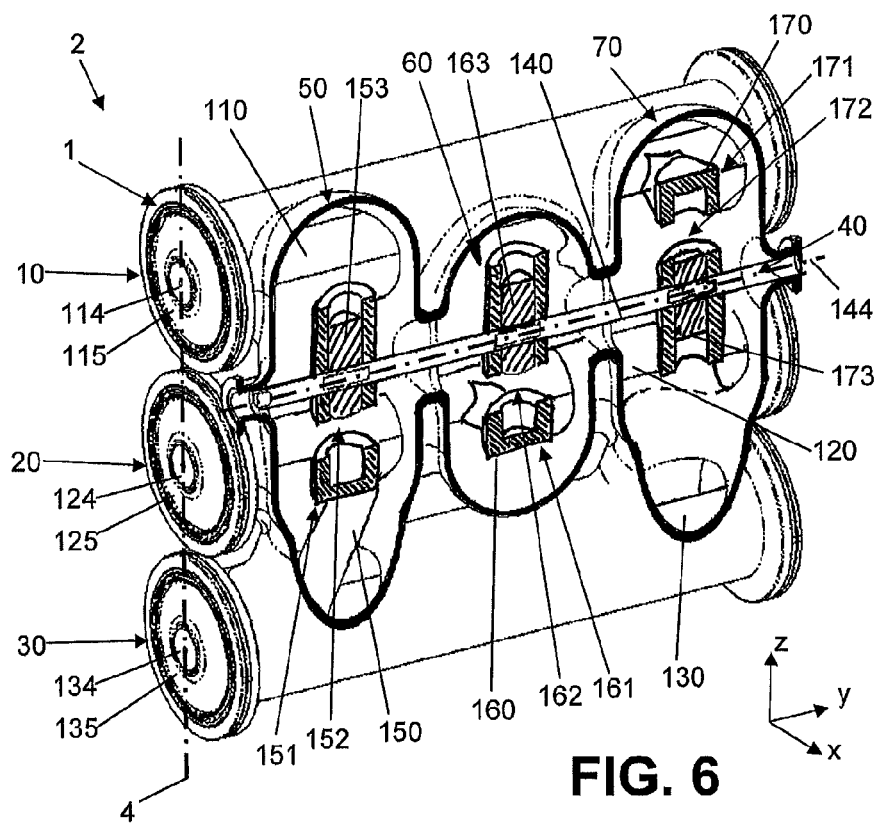
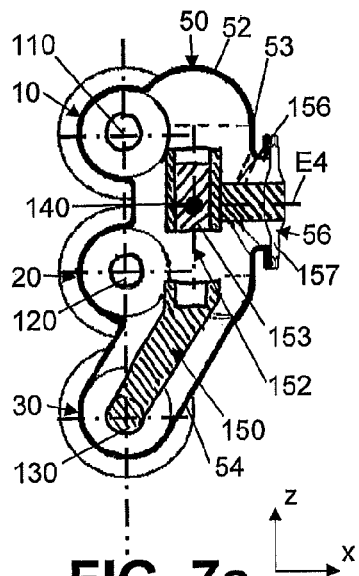 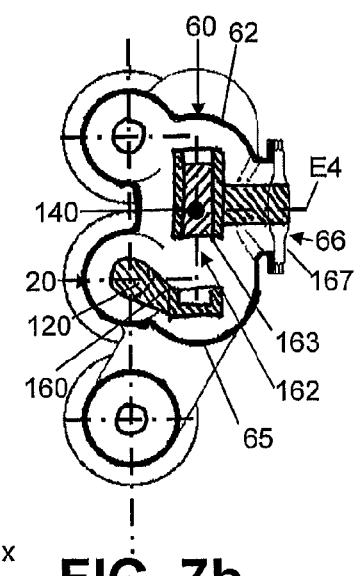 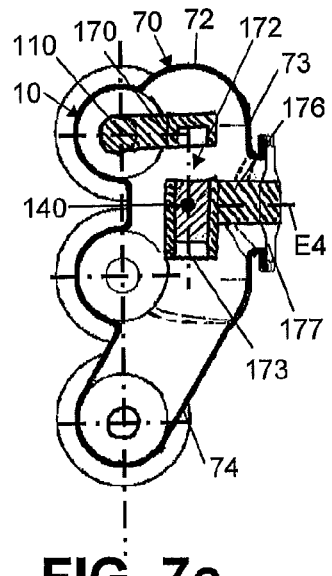
FIG. 6
FIG. 7a    FIG. 7b    FIG. 7c

US 8,848,345 B2

SWITCHGEAR ASSEMBLY MODULE AND SWITCHGEAR ASSEMBLY

RELATED APPLICATION

This application claims priority as a continuation application under 35 U.S.C. §120 to PCT/EP2010/050514, which was filed as an International Application on Jan. 18, 2010 designating the U.S., the entire contents of which is hereby incorporated by reference in its entirety.

FIELD

The invention relates to switchgear assemblies such as gas-insulated high-voltage switchgear assemblies (also referred to as GIS), and relate to a switchgear assembly module for a switchgear assembly.

BACKGROUND INFORMATION

In gas-insulated high-voltage assemblies, a modular design of the functional groups such as circuit breakers, grounding switches etc. of a switch bay is known. In this case, a switch bay is generally understood to mean a switchbay of a switchgear assembly and can also be referred to as an outgoer switchbay, for example. In GIS switchgear assemblies found on the market, GIS with switch bays having single-phase-encapsulated guidance of the primary conductors will differ fundamentally from GIS with switch bays having a three-phase-encapsulated guidance of the primary conductors. Single-phase encapsulation is understood to mean encapsulation which provides a dedicated gas space for each of the primary conductors, while three-phase encapsulation is understood to mean the arrangement of three primary conductors in a common gas space. Primary conductors are understood to mean conductors which have a rated load in the high-voltage range.

The type of encapsulation (single-phase or three-phase) can be dictated by the desired rated voltage: single-phase-encapsulated switch bays (bays) enable a much higher rated voltage with comparable complexity. Furthermore, the type of encapsulation has fundamental effects on the layout of the bays and on the configuration and arrangement of the modular functional groups. An example of a housing for a three-phase-encapsulated guidance of the primary conductors is described in WO 2008/022893 A1, for example.

In order to implement a gas-insulated substation, at least two bays can be connected to a so-called busbar on the input or output side. In this case, the term busbar includes primary conductor bars which are guided both with single-phase and with three-phase encapsulation. Thus, GIS with single-phase-encapsulated busbar guidance and GIS with three-phase-encapsulated busbar guidance can differ with respect to the busbar as well.

Because GIS are often also used in built-up areas or other spatially restricted areas, the compactness of a substation can be very important, in addition to the performance. In order to meet both of these demands, attempts are made to increase the power density (per physical volume) of a GIS switch bay. The maintenance friendliness of a GIS switchgear assembly is also important.

SUMMARY

An exemplary switchgear assembly module for a switchgear assembly is disclosed with a housing, which forms a common gas space for accommodating an insulating gas for the switchgear assembly module, the switchgear assembly module comprising: a busbar conductor arrangement having three busbar conductor sections, which are accommodated in the common gas space; an outgoing conductor connection group with three outgoing conductor openings and with three outgoing conductor sections, which extend from within the housing towards a respective one of the outgoing conductor openings; and three switch disconnectors, which each connect a respective one of the busbar conductor sections to a respective one of the outgoing conductor sections via a disconnection point, wherein an outgoing normal plane is defined by the three outgoing conductor openings and is parallel to mid-perpendiculars of the outgoing conductor openings, and wherein the disconnection points are arranged spatially in such a way that at least the disconnection point of a first one of the switch disconnectors is arranged on a first side of the outgoing normal plane and the disconnection point of a second one of the switch disconnectors is arranged on a second side, which is opposite the first side, of the outgoing normal plane.

An exemplary switchgear assembly module for a switchgear assembly is disclosed with a housing, which forms a gas space for accommodating an insulating gas for the switchgear assembly module, the switchgear assembly module comprising: a busbar conductor arrangement having three busbar conductor sections; an outgoing conductor arrangement having three outgoing conductor sections; three switch disconnectors, which each connect one of the busbar conductor sections to a respective one of the outgoing conductor sections via a disconnection point; and an actuating shaft for actuating the switch disconnector, which actuating shaft extends along an actuation axis, wherein a switch disconnector plane is fixed by a connecting straight line, which connecting straight line is perpendicular to the actuation axis and connects one of the disconnection points to the actuation axis, and the actuation axis, wherein the switch disconnector plane is aligned perpendicular to the connecting straight line and contains the actuation axis, and wherein the disconnection points and the actuation axis are arranged spatially such that at least the disconnection point of a first one of the switch disconnectors is arranged on a first side of the switch disconnector plane and the disconnection point of a second one of the switch disconnectors is arranged on a second side, which is opposite the first side, of the switch disconnector plane.

BRIEF DESCRIPTION OF THE DRAWINGS

The exemplary embodiments will be explained with reference to features illustrated in figures and providing further advantageous aspects and modifications. In said figures:

FIGS. 3a to 3c show lateral cross sections through the switchgear assembly module housing in accordance with an exemplary embodiment;

FIG. 4a shows a perspective view of the switchgear assembly module housing from above in accordance with an exemplary embodiment;

FIG. 4b shows a horizontal cross-sectional view of the switchgear assembly module housing in accordance with an exemplary embodiment;

FIG. 6 shows a perspective cross-sectional view of a switchgear assembly module with the switch disconnectors open in accordance with an exemplary embodiment;

FIGS. 7a to 7c show lateral cross sections through the switchgear assembly module shown in FIG. 6 in accordance with an exemplary embodiment.

DETAILED DESCRIPTION

Figure 1A:
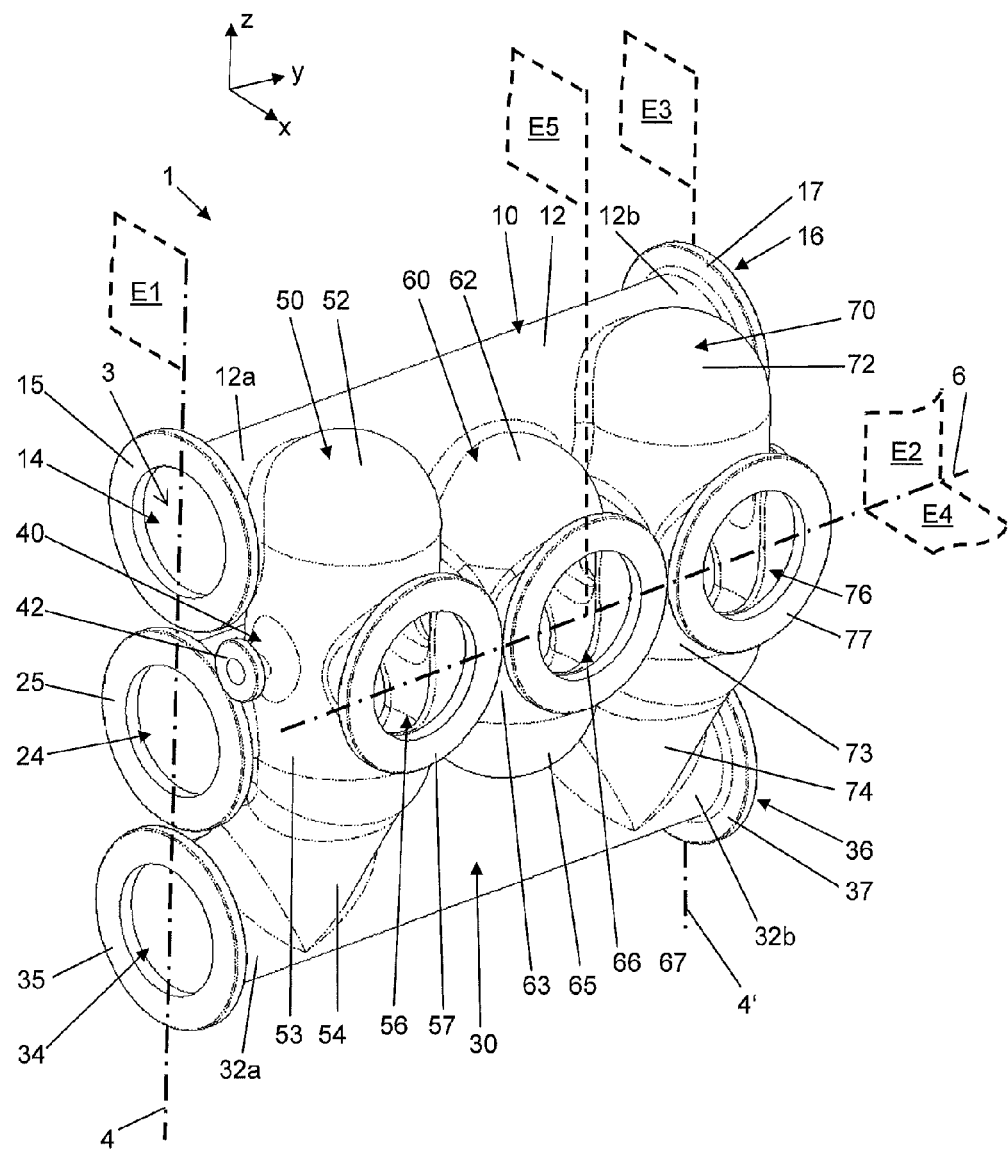
FIGS. 1a and 1b each show a perspective view of a housing for a switchgear assembly module in accordance with an exemplary embodiment.

Exemplary embodiments of the present disclosure provide a switchgear assembly module for a switchgear assembly. The switchgear assembly module has a housing, which forms a common gas space for accommodating an insulating gas for the switchgear assembly module, and includes a busbar conductor arrangement having three busbar conductor sections, which are accommodated in the common gas space; an outgoing conductor connection group with three outgoing conductor openings and with three outgoing conductor sections, which extend from within the housing towards a respective one of the outgoing conductor openings; and three switch disconnectors, which each connect (i.e. optionally connect) a respective one of the busbar conductor sections to a respective one of the outgoing conductor sections via a disconnection point. Owing to the three outgoing conductor openings, an outgoing normal plane is defined by virtue of the fact that the outgoing normal plane is parallel to the mid-perpendiculars of the outgoing conductor openings. The disconnection points are arranged spatially in such a way that at least the disconnection point of a first one of the switch disconnectors is arranged on a first side of the outgoing normal plane and the disconnection point of a second one of the switch disconnectors is arranged on a second side, which is opposite the first side, of the outgoing normal plane. In an exemplary embodiment, the outgoing normal plane (in this case also referred to as the outgoing normal mid-plane) is defined by virtue of the fact that the outgoing normal plane contains the mid-perpendiculars of the outgoing conductor openings.

One advantage of the exemplary embodiments described in the present disclosure provides that the arrangement of the disconnection points on different sides of the outgoing normal plane makes it possible for there to be an increased distance between these disconnection points. As a result, the voltage difference between these disconnection points results in a reduced electrical field. This is also advantageous since particularly high electrical fields can occur at the disconnection points and these high electrical fields therefore represent a particularly critical part for electric shielding. The arrangement of the disconnection points therefore overall enables improved electrical shielding of the three outgoing phase conductor sections with respect to one another, without it being necessary to dispense with the advantages of a three-phase-encapsulated arrangement, such as compact design. Owing to the improved electrical shielding, a more compact design and/or a higher voltage is also possible. Overall, aspects of the exemplary embodiments therefore contribute to a high-performance switchgear assembly module with good electrical shielding and at the same time a compact design.

A further advantage of the exemplary embodiments of the present disclosure provide that, owing to the outgoing conductor openings, an at least partially single-phase-encapsulated structure is possible which can also be used for high voltages of high magnitude. The advantages of a single-phase-encapsulated primary conductor guidance, such as the modularity and versatility of the parts, for example, are additionally combined with advantages of a three-phase-encapsulated modular design. Therefore, owing to the common gas space, simplified monitoring of the gas pressure and overall a reduction in the housing material and the gas volume specified are made possible, for example. Insulating gas should be introduced once, for the gas to be monitored once and for only a single excess pressure protection mechanism to be provided. Owing to the fact that the housing performs a plurality of functions of the module (branching of a busbar and switch disconnector), a reduction in costs is also possible. In addition, a module not only with small outer dimensions, but also with a small internal volume is now possible, with the result that the protective gas fill volume can also be reduced. A further contribution to the potentially space-saving design is provided by virtue of the fact that the primary connections can be arranged close to one another.

A further advantage of the exemplary embodiments disclosed herein provide flexibility in use of the switchgear assembly module in the context of a modular system. For example, the switchgear assembly module can be used in the context of a double busbar system, a single busbar system, or a ring busbar system and/or as a bridge module. Modularity is understood to mean the versatility in use of the housing. The switchgear assembly module is suitable for all types of switch bays, even for coupling bays. The switchgear assembly module can be extended in a plurality of directions (for example x and y direction) and therefore makes interconnected structures along a plurality of directions possible. In this case, straightforward bay layouts are possible since all three phases are guided parallel to one another. The direction of a conductor bundle of three phase conductors can be deflected without any problems.

In accordance with exemplary embodiments of the present disclosure, an orthogonal x-y-z reference system is defined by virtue of the fact that the first straight line defines the z direction. In accordance with one aspect, the second straight line defines a y direction, which is perpendicular to the z direction, and therefore also an x direction, which is perpendicular to the z and y directions.

Exemplary embodiments will now be described with reference to the figures in general terms and in a manner which is not restricted to the present embodiment. The clarity of the figures is achieved by virtue of the fact that, according to the situation, no hatching of the interfaces has been provided in the sectional illustrations for reasons of simplicity. For improved understanding of the description, the terms "upper", "lower", "left-hand", "right-hand", "front", "horizontal", "vertical" and variations thereof are merely in relation to the alignments of the objects illustrated in the figures.

Figure 8:
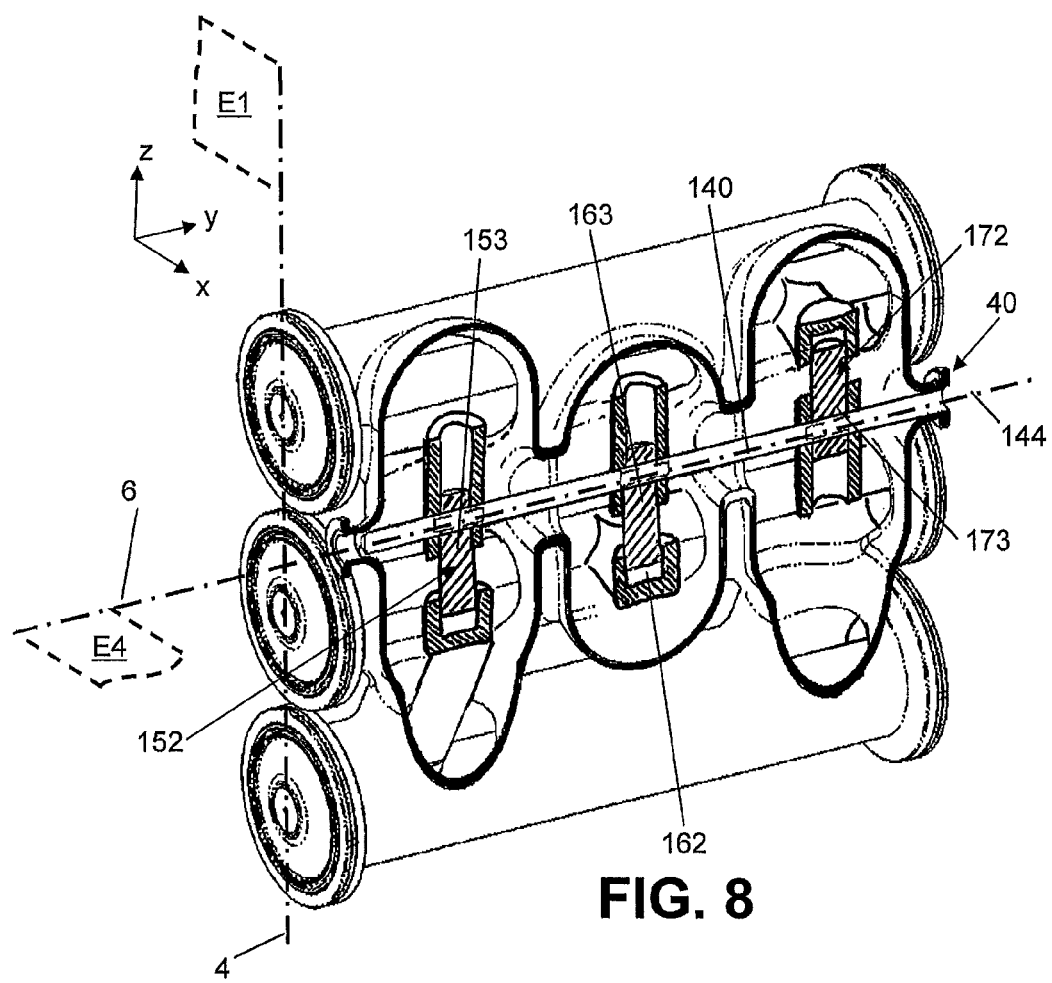
FIG. 8 shows a perspective cross-sectional view of the switchgear assembly module shown in FIG. 6 with the switch disconnectors closed in accordance with an exemplary embodiment.

FIGS. 1a to 4b show various views of a housing 1 for a switchgear assembly module in accordance with a representative embodiment of the invention. The associated switchgear assembly module 2 is illustrated in FIGS. 6 to 8 and described further below. The housing 1 will be described below with reference to these figures jointly using the orthogonal x-y-z coordinate system likewise illustrated in the figures.

Figure 1B:
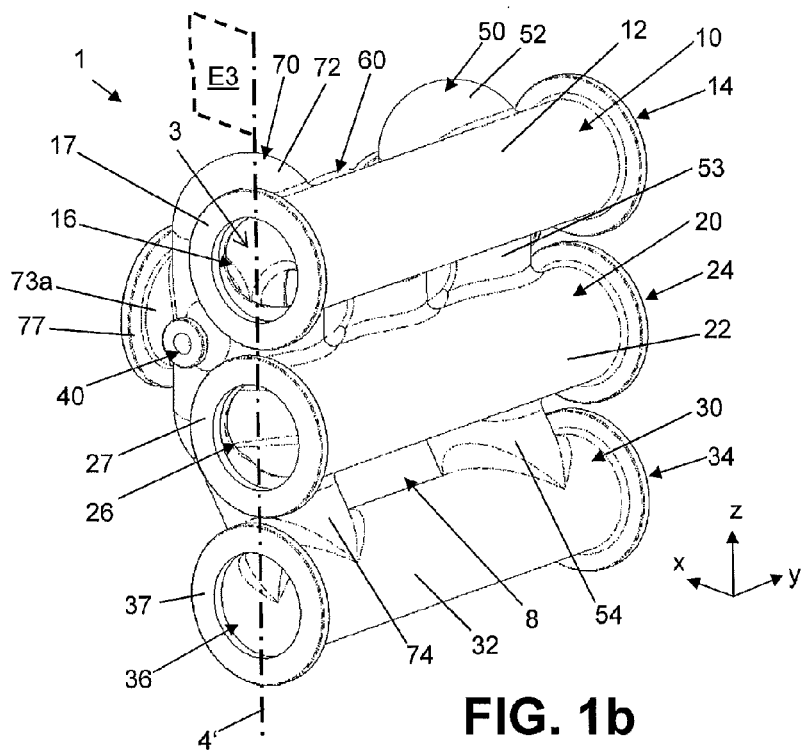
Figure 2A:
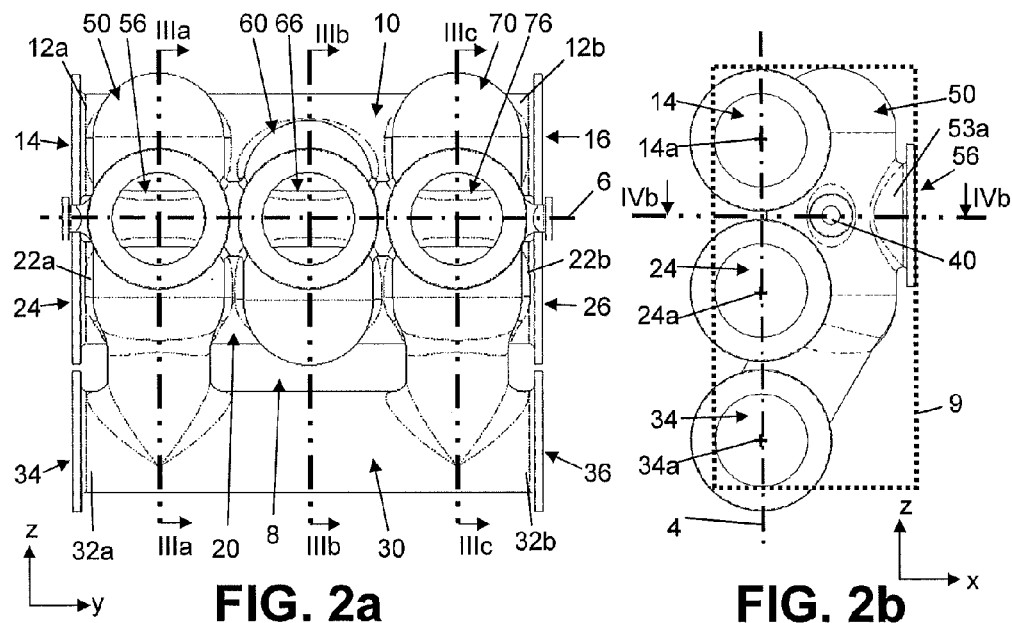
FIGS. 2a and 2b show perspective front and side views, respectively, of the switchgear assembly module housing in accordance with an exemplary embodiment.
Figure 2B:
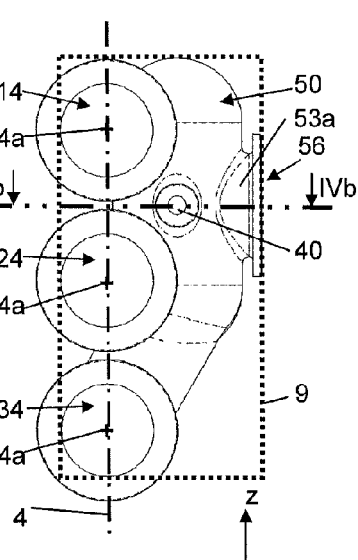

In particular, FIGS. 1a and 1b each show a perspective view of a housing for a switchgear assembly module in accordance with an exemplary embodiment; FIGS. 2a and 2b show perspective front and side views, respectively, of the switchgear assembly module housing in accordance with an exemplary embodiment; FIGS. 3a to 3c show lateral cross sections through the switchgear assembly module housing in accordance with an exemplary embodiment; FIG. 4a shows a perspective view of the switchgear assembly module housing from above in accordance with an exemplary embodiment; and FIG. 4b shows a horizontal cross-sectional view of the switchgear assembly module housing in accordance with an exemplary embodiment.

The switchgear assembly module housing 1 has three busbar housing sections 10, 20, 30. The upper busbar housing section 10 extends longitudinally in the y direction from an upper, first busbar opening 14 to an upper, second busbar opening 16. The upper busbar housing section 10 has a central, tubular housing section 12 and two tube stumps 12a and 12b arranged at the ends, an upper, first busbar opening 14, an upper, second busbar opening 16, a flange 15 surrounding the upper, first busbar opening 14, and a flange 17 surrounding the upper, second busbar opening 16.

The central and the lower busbar housing sections 20 and 30, respectively, also extend in the y direction between corresponding central and lower, respectively, first and second busbar openings 24 and 26 and, respectively, 34 and 36, and each have cylindrical housing sections (for example housing section 32), tube stumps 22a and 22b and, respectively, 32a and 32b and flanges 25 and 27 and, respectively, 35 and 37, which surround the respective busbar openings 24 and 26 and 34 and 36, respectively. The description of the upper busbar housing section 10 and its components applies to the busbar housing sections 20 and 30 correspondingly. The cylinder axes of the housing sections 11, 21 and 31 extend parallel to one another in the y direction. The cylinder axes are arranged one above the other in the z direction, with the result that they lie jointly in a y-z plane.

The respective busbar openings 14, 16 and 24, 26 and 34, 36 are arranged concentrically with respect to the respective cylinder axis on mutually opposite end faces of the respective housing sections 11, 21, 31. The busbar openings 14, 24, and 34 arranged on one side of the housing (also referred to as the first busbar openings) form a first busbar connection group. Correspondingly, the busbar openings 16, 26, and 36 arranged on the opposite side of the housing (also referred to as second busbar openings) form a second busbar connection group.

Furthermore, the switchgear assembly module housing 1 has a cylindrical actuating shaft housing section 40. The actuating shaft housing section 40 is configured concentrically with respect to a cylinder axis or actuation axis 144 (see FIG. 4b), which runs parallel to the second straight line 6. The actuating shaft housing section 40 furthermore has a protruding actuating shaft end piece 42 in order to enable the actuation of switching elements arranged in the gas space 3 during operation of the housing 1. The actuating shaft end piece 42 is fitted concentrically with respect to the cylinder axis or actuation axis 144 of the actuating shaft housing section 40 on the end face thereof. As can be seen from FIG. 1b, a corresponding actuating shaft end piece is also illustrated on the opposite end face. Both actuating shaft end pieces are closed. In other embodiments, at least one of these actuating shaft end pieces has an actuating shaft opening, through which the actuating shaft is passed out of the housing, or a driveshaft for the actuating shaft is inserted into the housing. Fastening means for fastening an actuating device for driving the actuating shaft are fitted on the actuating shaft end piece 42 (not illustrated).

The switchgear assembly module housing 1 furthermore has an outgoing conductor connection group. The outgoing conductor connection group has a first conductor outgoing housing section 50 with a cylindrical housing section 53, which extends in the z direction and is limited at the top by an upper end piece 52 and at the bottom by a transition piece 54. A cylindrical tube stump 53a extends laterally in the x direction (direction of the cylinder axis of the tube stump) away from the cylindrical housing section 53. A tube stump is understood to mean a tubular end piece, with tubular meaning that the piece has a hollow profile. The tube stump 53 opens out at an outgoing conductor opening 56. The outgoing conductor opening 56 has a flange 57 surrounding it.

Correspondingly, the outgoing conductor connection group also has a second and third conductor outgoing housing section 60, 70, which each have a cylindrical housing section 63 and 73 and a respective upper end piece 62 and 72. The respective tube stumps 63a and 73a extend laterally in the x direction away from the respective cylindrical housing sections 63 and 73 and open out at respective outgoing conductor openings 66 and 76. The outgoing conductor openings 66 and 76 are surrounded by respective flanges 67 and 77. While the third conductor outgoing housing section 70 likewise has a transition piece 74 corresponding to the first transition piece 54, the second conductor outgoing housing section 60 does not have such a transition piece. Instead, the second conductor outgoing housing section 60 is limited at the bottom by a lower end piece 65.

FIGS. 1a and 1b show the arrangement and some properties of the various parts of the switchgear assembly module shown in. Individual aspects of this description represent general aspects of the invention, in accordance with which further embodiments can also be configured independently of the details of the switchgear assembly module shown in FIGS. 1a and 1b. First, the arrangement and some properties of the busbar housing sections 10, 20, 30 and parts thereof will be described.

The busbar openings 14, 24 and 34 (also referred to as first busbar openings) are arranged in terms of area in a first opening plane E1. This means that the respective opening areas defined by the rims of the three first busbar openings 14, 24, and 34 each lie areally in the first opening plane E1. This opening plane E1 is an x-z plane, i.e. a plane extending in the x and z directions. The busbar openings 14, 24 and 34 are furthermore arranged along a first straight line 4, i.e. respective centers 14a, 24a, 34a of the openings 14, 24, 34 (or their opening areas) lie on this first straight line 4, as can be seen particularly well from FIG. 2b, for example.

The three second busbar openings 16, 26 and 36 are arranged on a side of the housing which is directly opposite the three first busbar openings 14, 24, 34. The second busbar openings 16, 26 and 36 are arranged areally in a further plane E3. The plane E3, also referred to as the third opening plane, is likewise an x-z plane, and is therefore parallel to the first opening plane E1. The second busbar openings 16, 26 and 36 are also arranged along a third straight line 4', which runs parallel to the first straight line 4.

The first busbar openings 14, 24, 34 are each directed towards the y direction, i.e. their normal (normal with respect to the opening plane) extends in the y direction. The first busbar openings 14, 24, 34 define a first busbar normal plane (y-z plane), which is spanned by the first straight line 4 and the mutually parallel normal of each opening 14, 24, 34, with the result that these normals all lie in the busbar normal plane. In other words, the first busbar openings 14, 24, 34 are arranged in such a way that busbar conductors which leave the openings centrally and perpendicular (i.e. parallel to the normal) lie in this busbar normal plane. The second busbar normal plane defined in a corresponding manner by the second busbar openings 16, 26, 36 is identical to the busbar normal plane defined by the first busbar openings 14, 24, 34, namely the y-z plane, which contains the straight lines 4 and 4'. Thus, busbar conductors lying in this busbar normal plane can pass in a straight line through the housing 1.

Each of the three second busbar openings 16, 26, 36 is arranged in pairs with respect to a respective one of the three first busbar openings 14, 24, 34. As a result, three busbar opening pairs (14, 16), (24, 26) and (34, 36) are formed, between which in each case one of the busbar housing sections 10, 20 and 30 is positioned, respectively. This arrangement makes it possible to accommodate a respective, continuous, straight busbar conductor section between the busbar openings in the respective pair. The busbar conductor section extends in the y direction, i.e. perpendicular to the first and to the third opening planes E1 and E3.

The busbar housing sections 10, 20, 30 define respective cylindrical internal volumes or gas space sections. The internal volumes are part of the common gas space and are fluidically (e.g., hydraulically) connected to these further parts and to one another. Since the housing serves to accommodate an insulating gas, "fluid" will also be understood below to mean a gas. The busbar openings 14, 24, 34 and 16, 26 and 36 are. The respective cylinder axes of this internal volume extend in the y direction. The respective cylinder axes are in particular defined by the tubular longitudinal sections 12, 22, 32 and the tube stumps 12a, 12b, 22a, 22b and 32a, 32b that are arranged concentrically with respect to the respective cylinder axes. Each of the three busbar opening pairs (14, 16), (24, 26) and (34, 36) therefore limits a cylindrical gas space section of the gas space at the ends, which gas space section extends between said busbar opening pairs. The cylindrical gas space sections (at least sections of which have a substantially circular cross section) extend in each case along the respective cylinder axis. In other exemplary embodiments (not illustrated) of the present disclosure, the cross section of the gas space sections can also be oval or nonuniform. In these embodiments, the busbar housing sections 10, 20, 30 and the gas space sections thereof have a straight longitudinal axis instead of a cylinder axis.

The busbar housing sections 10, 20 and 30 are arranged to be spaced apart from one another. This means that the distance between the cylinder axes is greater than the cylinder diameter or than double the radius of curvature of the busbar housing sections 10, 20 and 30, respectively. The cylinder diameter or radius of curvature is predetermined by the housing outer side. The three busbar housing sections 10, 20, 30 are arranged in a row at a uniform distance from one another along the first straight line 4 in the z direction.

The three first busbar openings 14, 24, 34 serve to separately accommodate a respective one of three gas-insulated busbar conductor sections of the switchgear assembly. Likewise, the three second busbar openings 16, 26, 36 serve to separately accommodate a respective one of the three busbar conductor sections. The busbar openings could therefore also be referred to as busbar conductor openings. Separately accommodate is in this case understood to mean that the busbar conductors are each arranged in single-phase fashion in the respective openings, in particular are arranged so as to pass through a single-phase insulator.

The busbar openings 14, 16, 24, 26, 34 and 36 are each arranged on an end face of a respective separate, i.e. specially associated tube stump 12a, 12b, 22a, 22b, 32a and 32b respectively, and are connected via said tube stump to a main chamber of the common gas space. The tube stumps are spaced apart from one another, i.e. are not fused with one another.

The busbar openings 14, 24, 34 and 16, 26 and 36 are surrounded circumferentially by respective flanges 15, 25, 35 and 17, 27, 37. The flanges are spaced apart from a wall section of the main chamber by tube stumps 12a, 12b, 22a, 22b, 32a, 32b and are configured as independent flanges.

Each of the busbar openings has a dedicated separate flange, i.e. the flanges are spaced apart from one another. The flanges 15, 25, 35 are in a common plane, the first opening plane E1. Likewise, the flanges 17, 27, 37 lie in a common plane, the third opening plane E3. As can be seen from FIGS. 3a to 3c, each of the flanges is provided with continuous screw holes for fastening screws, with the aid of which a barrier insulator or a post insulator can be fastened on the respective flange. Depending on specifications, the screw hole can be in the form of a through-hole or a threaded hole. These screw holes are not shown in the remaining figures, for reasons of simplicity, but such screw holes are provided in all flanges 15, 25, 35, 17, 27, 37 and 57, 67, 77 (see below), even if they are not illustrated in some figures. Barrier insulators, conductors passing through said barrier insulators and further such elements do not belong to the housing in the narrow sense and are not illustrated in FIGS. 1 to 4b. These elements are illustrated in FIG. 6 and are described further below in more detail with reference to FIG. 6.

FIG. 6 shows a perspective cross-sectional view of a switchgear assembly module with the switch disconnectors open in accordance with an exemplary embodiment. Each of the flanges 15, 25, 35 is fitted on the end of a respective one of the tube stumps 12a, 22a and 32a and protrudes laterally from the respective tube stump. As a result, each of the flanges 15, 25, 35 is accessible from outside the housing, from a region behind the respectively associated opening 14, 24, 34. As a result, the fastening devices for the barrier insulators are accessible from outside the housing volume, and simple fitting, dismantling and maintenance of the housing 1 is made possible. The above also applies correspondingly to the second busbar openings 16, 26, 36 (fitted on the end of a respective tube stump 12b, 22b or 32b) and to the flanges 17, 27, 37 thereof.

An exemplary arrangement and properties of the outgoing conductor connection group with the outgoing conductor openings 56, 66, 76 and the outgoing conductor housing sections 50, 60, 70 are described below. The outgoing conductor openings 56, 66, 76 serve to separately accommodate in each case one of three outgoing conductors, to be more precise outgoing nominal conductors of the switchgear assembly. The outgoing conductor openings 56, 66, 76 are arranged areally in a second opening plane E2 and along a second straight line 6. This second straight line 6 runs perpendicular to the straight lines 4 and 4'. The three outgoing conductor openings 56, 66, 76 are arranged on a respective one of the three outgoing conductor housing sections 50, 60, 70.

The outgoing conductor openings 56, 66, 76 are each directed towards the x direction, i.e. towards the direction perpendicular to the straight lines 4 and 6. In other words, the normal of the outgoing conductor openings 56, 66, 76 extends in the x direction. Thus, the outgoing conductor openings 56, 66, 76 define an outgoing normal plane E4 (x-y plane), which contains the second straight line 6 and is perpendicular to the second opening plane E2. The outgoing normal plane E4 is therefore the plane E4 spanned by the second straight line 6 and the mutually parallel normals of the outgoing conductor openings 56, 66, 76. Outgoing nominal conductors, which leave the outgoing conductor openings 56, 66, 76 centrally and perpendicularly, therefore lie in the outgoing normal plane E4. The outgoing normal plane E4 can also be defined in another way, for example as the plane, which is perpendicular to the first straight line 4 and contains the second straight line 6. More generally, an outgoing normal plane is understood to be not only the plane E4, but also any plane spanned by the mutually parallel normals of the outgoing conductor openings 56, 66, 76, i.e. any plane that is parallel to the plane E4.

The outgoing normal plane E4 intersects the busbar normal plane defined further above in a line of intersection, which is offset with respect to each of the mid-axes of the busbar openings 14, 24, 34 or the cylindrical busbar housing sections 12, 22, 32 in the direction of the first straight line 4 (z direction). The line of intersection is arranged between two of the busbar openings 14, 24, 34 and therefore outside the busbar openings 14, 24, 34. The outgoing normal plane is arranged centrally between the busbar opening 14 and the busbar opening 24. The advantages of this arrangement are described further below with reference to FIG. 6.

Each of the three outgoing conductor openings 56, 66, 76 is surrounded circumferentially by a respective flange 57, 67, 77. The flanges are arranged at the end of a respective one of the tube stumps 53a, 63a and 73a and lie in a common plane, the second opening plane E2 (y-z plane). Apart from this difference and further differences shown in FIGS. 1 to 4b, the same applies to the outgoing conductor openings 56, 66, 76, the tube stumps 53a, 63a, 73a and the flanges 57, 67, 77 as was stated further above for the corresponding parts of the first busbar openings.

In exemplary embodiments (not illustrated), the flanges of the first busbar openings and/or the second busbar openings and/or the outgoing conductor openings are completely or partially integrated in a common wall section of a main chamber of the housing, depending on the embodiment. Depending on the embodiment, at least two of the flanges of the first busbar openings and/or the second busbar openings and/or the outgoing conductor openings are connected to one another to form a flange group. For example, all of the flanges of the first busbar openings and/or the second busbar openings and/or the outgoing openings are connected to one another to form a respective first busbar flange group and/or second busbar flange group and/or outgoing flange group.

The outgoing conductor housing section 50 is in the form of a sausage and includes a cylindrical housing section 53 with a cylinder axis extending in the z direction. Furthermore, the outgoing conductor housing section 50 includes a rounded-off upper end piece 52, which is fitted as a terminating piece on an upper end side of the outgoing conductor housing section 50, and a tubular transition piece 54 on the end side opposite said upper end side. At least sections of the outgoing conductor housing section 50 (namely the section of the housing section 53) have a cylindrical internal volume. The outgoing conductor housing section 50 is therefore fused with the busbar housing sections 10, 20, 30 in such a way that it connects the internal volumes thereof to one another, as can be seen in more detail in FIG. 3a. The outgoing conductor housing section 70 has a corresponding configuration to the outgoing conductor housing section 50.

The centrally arranged outgoing conductor housing section 60 is likewise largely configured corresponding to the outgoing conductor housing section 50, but has the following differences: instead of a transition piece, the outgoing conductor housing section 60 also has a rounded-off lower end 65. The outgoing conductor housing section 50 is therefore fused with the busbar housing sections 10, 20 in such a way that it connects the internal volumes thereof directly to one another, as can be seen in more detail in FIG. 3b. On the other hand, the outgoing conductor housing section 60 is spaced apart (separated by the aperture 8) from the busbar housing section 30 and therefore does not have a direct connection with said busbar housing section. Overall, the outgoing conductor housing sections 50, 70 therefore connect the internal volumes of the three busbar housing sections 10, 20, 30 directly to one another, and the outgoing conductor housing section 60 connects the internal volumes of two of the busbar housing sections 10 and 20 directly to one another.

In exemplary embodiments of the present disclosure, the outgoing conductor housing sections 50, 60, 70 can also have different lengths and arrangements in the z direction, with the result that they connect different combinations of the busbar housing sections directly to one another. For example, in such an exemplary embodiment, the outgoing conductor housing section 70 is shortened at its lower end in such a way that it is fluidically connected directly only to the uppermost busbar housing section 10. The remaining outgoing conductor housing sections 50, 60 are as illustrated in FIGS. 1 to 4b, i.e. the outgoing conductor housing section 50 is fluidically connected directly to all three busbar housing sections 10, 20, 30 and the outgoing conductor housing section 60 is fluidically connected directly only to two of the three busbar housing sections, namely to the busbar housing sections 10 and 20.

In accordance with a further alternative, the outgoing conductor housing section 50 is fluidically connected directly only to the busbar housing section 10, the outgoing conductor housing section 60 is fluidically connected directly to the three busbar housing sections 10, 20, 30, and the outgoing conductor housing sections 70 is fluidically connected directly only to the busbar housing sections 10 and 20.

The outgoing conductor housing sections 50, 60, 70 are spaced apart from one another. The distance between their cylinder axes is greater than the diameter or double the radius of curvature of their cylindrical wall sections. To be more precise, the cylinder axes of the outgoing conductor housing sections 50, 60, 70 are arranged to be removed from one another at a uniform distance in the direction of the second straight line 6. The distance is equal to the distance by which the cylinder axes of the busbar housing sections 10, 20, 30 are spaced apart from one another. For this reason, the distance is also referred to as unit distance.

An exemplary arrangement and properties of the actuating shaft housing section 40 is suitable or intended for accommodating an actuating shaft for actuating switching elements which can be arranged in the gas space. The actuating shaft housing section 40 is cylindrical, with a cylinder axis 144 extending parallel to the busbar housing sections 10, 20, 30 (i.e. in the y direction). The cylinder axis is arranged in the second plane E2. The actuating shaft housing section 40 extends along the three outgoing conductor housing sections 50, 60, 70 and transversely with respect thereto. The actuating shaft housing section 40 provides an internal volume for accommodating an actuating shaft extending along the cylinder axis 144. The internal volume of the actuating shaft housing section 40 is connected directly to the respective interior of the outgoing conductor housing sections 50, 60, 70. The actuating shaft housing section is arranged to be offset in the x direction with respect to the cylinder axes of the busbar housing sections 11, 21, 31. The offset amounts to half the distance between the cylinder axes of the busbar housing sections 11, 21, 31 (in each case the distance from center to center), i.e. the unit distance.

The system of reference coordinates used and the general arrangement of some elements of the housing 1. x, y and z, as has already been mentioned above, refer to the directions of an orthogonal reference system (coordinate system). In this case, the z direction is defined by the direction of the first straight line 4. The y direction, which is perpendicular to the z direction, is then defined by the second straight line 6. Thus, the x direction is also defined as the direction perpendicular to the z and y directions.

Figure 5:
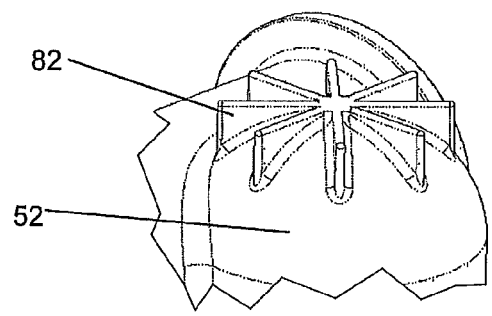
FIG. 5 shows part of a further switchgear assembly module housing in accordance with an exemplary embodiment.

FIG. 5 shows part of a further switchgear assembly module housing in accordance with an exemplary embodiment. The second straight line 6, along which the outgoing conductor openings 56, 66, 76 are arranged, is offset with respect to the first straight line 4 in the x direction, with the result that the first straight line 4 and the second straight line 6 do not intersect one another. The third straight line 4' runs parallel to the z direction. The first opening plane E1 extends parallel to the x and z directions (x-z plane). The second opening plane E2 extends parallel to the y and z direction (y-z plane). The second opening plane E2 is therefore arranged perpendicular to the first opening plane E1. The second straight line 6 runs perpendicular to the first opening plane E1. The first straight line 4 runs parallel to the second opening plane E2. The planes E1 to E4 are illustrated in FIG. 4b by dashed lines. In this case, the planes E1 to E3 run perpendicular to the plane of the drawing in FIG. 4b (in the z direction) and are therefore only visible as the dashed line. The plane E4 runs in the plane of the drawing in FIG. 4b. In addition, the actuation axis 144 is also illustrated as a dashed line in FIG. 4b.

The housing 1 can be used as a module in the context of a modular switchgear assembly concept, when the housing 1 is dimensioned with respect to a unit distance of the module. This unit distance is defined by the uniform distance at which the respective centers of the three first busbar openings 14, 24, 34 are arranged in relation to one another in a row along the first straight line 4. The respective centers of the three outgoing conductor openings 56, 66, 76 are likewise arranged in a row at the unit distance from one another along the second straight line 6. The respective centers of the three second busbar openings 16, 26, 36 are likewise arranged in a row at the unit distance from one another along a third straight line 4'.

The internal volume of the housing forms a continuous gas space. The busbar openings 14, 24, 34 and 16, 26, 36 and the outgoing conductor openings 56, 66, 76 each form a separate entrance to the gas space from outside the housing. The gas space is therefore connected to the three first and second busbar openings and to the three outgoing conductor openings. The common gas space serves, inter alia, to accommodate an insulating gas and three gas-insulated busbar conductor sections. The busbar openings 14, 24, 34 and 16, 26, 36 and the outgoing conductor openings 56, 66, 76 are configured such that they make it possible to accommodate single-phase insulators (i.e. insulators for accommodating only a single phase conductor). Thus, the housing 1 forms a continuous gas space 3 for the three-phase encapsulation of the busbar nominal conductors and has busbar openings 14, 24, 34 and 16, 26, 36 for busbar connections, which are guided away in single-phase fashion from the housing interior (connectors passed out in single-phase fashion from the housing interior). The same applies to the outgoing openings 56, 66, 76.

The housing is formed in substantially one piece, i.e. is manufactured from one piece, apart from parts which are not essential to the housing shape (inspection windows, entrances, barrier insulators etc.). Therefore, the housing can be fitted as a whole. The housing 1 is a casting, i.e. a part cast in a mold (and therefore having a cast-moldable configuration). The housing 1 is cast from aluminum or another metal and/or alloys thereof, which provided for welded variants of the housing 1. The housing 1 is configured such that it can withstand an internal pressure of at least 2 bar. In addition, the housing 1 is designed such that it would be capable of carrying its own mass if it were supported on at least two of the flanges, in particular on three of the flanges, in particular if it were supported on the flanges of the outgoing conductor openings 56, 66, 76. This condition places certain specifications on the torsion resistance of the wall material and the thickness of the flange connections, but does provide advantages as regards ease of fitting and fastening in a switch bay.

The housing 1 is designed such that it provides a common gas space (gas volume) for conductor sections arranged along a straight line (busbar conductor sections arranged along the straight lines 4 and 4' and outgoing conductor sections arranged along the straight line 6). The arrangement along a line enables effective mutual shielding and insulation even for high voltages as well as the possibility of using tried and tested concepts and layouts of single-phase-encapsulated switchgear assembly systems. Furthermore, the common gas volume has the advantage that the introduction of gas and the checking of the gas pressure are simplified.

Furthermore, the housing 1 is designed such that the outer surface of the housing 1 is at least partially designed to be constricted, i.e. has concave depressions. These depressions are provided, for example, in the transition region between the first busbar openings 14, 24, 34 and the outgoing conductor openings 56, 66, 76, between the second busbar openings 16, 26, 36 and the outgoing conductor openings 56, 66, 76 and/or between the first busbar openings 14, 24, 34 and the second busbar openings 16, 26, 36. The outer surface is in this case to be understood as meaning the total outer surface without taking into account the local elements, which are irrelevant, in this case, such as screws, grips etc.

The concave depressions result in a reduction in the gas volume and/or an increase in the surface area of the housing 1. In general and irrespective of the embodiment illustrated, the gas volume is reduced in comparison with an imaginary enveloping square 9, for example, by at least 20%, at least 30% in another example, or even at least 50% as desired. In this case, the imaginary square is defined as the smallest square, which completely surrounds the gas volume of the housing 1. FIG. 2b illustrates the corresponding imaginary square by virtue of the dotted square 9.

In addition, the housing has some apertures, which pass through the housing. The aperture 8, which extends in the region between the busbar housing sections 20 and 30 and between the two outer outgoing conductor housing sections 50 and 70, can be seen particularly well in FIG. 1b. The aperture 8 passes through the outer envelope and therefore also the interior volume of the housing 1. In this case, the aperture 8 should not be understood as being an opening in the housing wall, which would allow access to the gas space. The aperture does not produce a connection between the gas space and the exterior of the housing. Instead, in the context of the present disclosure an aperture is understood to mean a topological hole, which means that although the gas space forms a continuous volume, it does not form a singly continuous volume. The volume can also be described as a volume with a ring-like cross section running in the y-z plane (where "ring-like" should not exclude the possibility of yet further apertures being provided in addition to the aperture forming the interior of the ring).

Further such apertures extend in the region between the busbar housing sections 10 and 20 and firstly between the outgoing conductor housing sections 50 and 60 and secondly between the outgoing conductor housing sections 60 and 70.

The constricted housing shape and also the apertures have the advantage that the gas space 3 can be kept as small as possible, with the result that as small an insulating gas volume as possible needs to be provided. Since many insulating gases such as SF6 have unfavorable environmental properties and are expensive, this has the advantage that the specified quantity of insulated gas is reduced. In addition, the apertures have the advantage that they increase the ratio of the housing surface area to the interior volume thereof. As a result, the dissipation of heat from the housing is also increased. In addition, the apertures provide a transport handle for the housing and thus make it possible for the housing to be handled more easily.

In another exemplary embodiment of the housing 1 illustrated in FIGS. 1 to 4b includes the symmetry properties of the housing. The symmetries described below of the housing provide advantages in terms of its versatility in use in the context of a modular system. First, the openings, i.e. the first busbar openings 14, 24, 34, the second busbar openings 16, 26, 36 and the outgoing openings 56, 66, 76, already have symmetrical properties: many of these openings are arranged in mirror-symmetrical fashion with respect to a mirror plane E5, which in this embodiment corresponds to the plane identified by IIIb in FIG. 2a. This mirror plane IIIb is arranged parallel to the first opening plane E1. The mirror plane IIIb further runs through the central outgoing conductor opening 66. Not only the openings, but also the entire housing is constructed to be substantially mirror-symmetrical with respect to the mirror plane IIIb. Substantially mirror-symmetrical in this case means, in addition to the above-described symmetry with respect to the busbar and outgoing openings, also symmetry with respect to the main geometry of the housing (but not with respect to any auxiliary connections and other nonessential details). In terms of quantity, "substantially mirror-symmetrical" means that the volume of the gas space 3, which is not overlapping when, mirrored should not be more than 5% of the total volume of the gas space 3.

Furthermore, FIG. 2a illustrates the manner in which the outgoing conductor housing sections 50, 70 each connect the internal volumes of the busbar housing sections 10, 20, 30 to one another. The outgoing conductor housing section 60, on the other hand, only connects the internal volumes of the busbar housing sections 10 and 20 to one another, but does not produce a connection with the internal volume of the busbar housing section 30. The outgoing conductor housing section 60 is separated from the busbar housing section 30 by the aperture 8. This can likewise be seen in FIGS. 3a to 3c, which illustrate lateral cross sections through the switchgear assembly module housing 1, in each case along the cross-sectional planes IIIa, IIIb and IIIc extending in the x-z direction (see FIG. 2a): it can likewise be seen from FIGS. 3a and 3c how the outgoing conductor housing sections 50, 70 each connect the internal volumes of the busbar housing sections 10, 20, 30 to one another. It can be seen from FIG. 3b how the outgoing conductor housing section 60 only connect the internal volumes of the busbar housing sections 10 and 20 to one another, but is separated from the busbar housing section 30 by the aperture 8. The housing illustrated in FIGS. 1a to 4b can be made universal in various ways. It is thus also possible, for example, for the second busbar openings not to be designed to be mirror images of the first busbar openings, but to be arranged differently with respect to the first busbar openings. In general, the second busbar openings can also be opposite the first busbar openings, for example at an angle. It is also possible for the second straight line 6 to be inclined with respect to the first straight line 4 in a different way than at a right angle, for example, it can have an angle of 45°.

FIG. 5 shows part of a further switchgear assembly module housing in accordance with an exemplary embodiment. As shown in FIG. 5, the upper end 52 of the conductor outgoing housing section 50 (see FIG. 1a) is varied in comparison with FIGS. 1a to 4b. In FIG. 5, a cooling device for increasing (in comparison with a normal, smooth surface) the heat dissipation from the internal volume of the housing over the housing surface is fitted at the end 52. In FIG. 5, the cooling device includes cooling ribs 82 running in the form of a star. The upper end pieces of the remaining conductor outgoing housing sections are varied in a similar manner and provided with a corresponding cooling device. In alternative embodiments (not illustrated), the cooling device instead has cooling ribs running parallel to one another or cooling ribs 86 running in the form of concentric circles. As a further variation, it is also possible for an active cooling device (with energy supplied for the cooling, for example a fan) to be used instead of the passive cooling devices illustrated in FIG. 5. It is also possible for a thermosyphon to be used. A cooling device is in this case understood to mean that it has an active or passive structure with systematically improved cooling in comparison with a smooth surface.

Such a cooling device has the advantage that heat can be dissipated more efficiently from the housing interior. The arrangement on a terminating piece of the outgoing conductor housing section, i.e. in this case on the upper end pieces 52, 62, 72 of the conductor outgoing housing sections 50, 60, 70 (see FIG. 1a), has the advantage that, owing to the position right at the top in the housing, the heat has a tendency to accumulate and therefore can be dissipated effectively from there.

The switchgear assembly module housing 1 furthermore has various openings, entrances and inspection windows, which can be closed in a gas-tight manner (not illustrated). The inspection windows and entrances are closed in a gas-tight manner, but can be partially opened in order to enable monitoring and maintenance of the housing interior. The entrances can also be connected to a gas line for introducing gas into the housing interior and for monitoring the gas pressure. The inspection windows can be equipped with rupture disks.

FIGS. 6 to 8 show a switchgear assembly module 2 in accordance with an exemplary embodiment of the invention, which comprises the above-described housing 1. FIG. 5 shows part of a further switchgear assembly module housing in accordance with an exemplary embodiment. FIGS. 7a to 7c show lateral cross sections through the switchgear assembly module shown in FIG. 6 in accordance with an exemplary embodiment. FIG. 8 shows a perspective cross-sectional view of the switchgear assembly module shown in FIG. 6 with the switch disconnectors closed in accordance with an exemplary embodiment. These figures are described together below.

The switchgear assembly module 2 has a housing 1 as illustrated in FIGS. 1a to 4b. The corresponding parts of the housing 1 have already been described further above. Furthermore, the switchgear assembly module 2 has a busbar conductor arrangement with three busbar conductor sections 110, 120 and 130 and an outgoing conductor connection group with three outgoing busbar connectors 150, 160, 170. The outgoing busbar connectors 150, 160, 170 each have an outgoing conductor section 156, 166, 176, which extends from the interior of the housing 1 to a respective one of the outgoing connection openings 50, 60, 70. Furthermore, an actuating shaft 140 is arranged within the actuating shaft housing section 40. The actuating shaft 140 extends within the actuating shaft housing section 40 along the actuating shaft axis 144 (in the y direction), which at the same time forms the cylinder axis of the actuating shaft housing section 40. The busbar conductor sections can also be referred to as busbar nominal conductors or busbar phase conductors, and the outgoing conductor sections can also be referred to as outgoing nominal conductors or outgoing phase conductors.

Each of the busbar conductor sections 110, 120 and 130 extends within a respective one of the busbar housing sections 10, 20, 30 between a respective one of the first busbar connection openings 14, 24, 34 and a respective one of the second busbar connection openings 16, 26, 36 (see FIG. 1b). The busbar conductor sections 110, 120 and 130 extend in a straight line between these ends along the respective cylinder axes of the respective cylindrical housing sections 11, 21, 31. Barrier insulators 115, 125, 135 are fitted on the first busbar connection openings 14, 24, 34, with respective first ends 114, 124, 134 of the busbar conductor sections 110, 120, 130 being arranged in the center of said barrier insulators (or the ends 114, 124, 134) extend from the center of said barrier insulators). The barrier insulators 115, 125, 135 hold the respective ends 114, 124, 134 of the busbar conductor sections 110, 120 and 130 and said ends pass through said barrier insulators in order to produce a connection to sections of the busbar which are located outside the housing 1. Likewise, corresponding barrier insulators are fitted on the second, opposite busbar connection openings 16, 26 and 36 (see FIG. 1b), with respective second ends of the busbar conductor sections 110, 120, 130 being arranged in the center of said barrier insulators in order to produce a connection to sections of the busbar which are located outside the housing 1. Each of the three busbar conductor sections 110, 120, 130 therefore extends centrally within a respective one of the busbar housing sections 10, 20, 30 along the respective cylinder axis thereof (y direction).

The busbar conductor sections 110, 120, 130 extend at least in the region of the first and the second busbar openings in the above-described busbar normal plane, i.e. the (y-z) plane, which contains the first straight line 4 and is perpendicular to the first opening plane E1.

Each of the outgoing busbar connectors 150, 160, 170 extends within a respective one of the outgoing housing sections 50, 60, 70 from a respective one of the busbar conductor sections 110, 120, 130 to a respective one of the outgoing connection openings 56, 66, 76 in order to connect the respective one of the busbar conductor sections 110, 120, 130 to the interior of the respective one of the connection openings 56, 66, 76. Barrier insulators 157, 167, 177 are fitted on the outgoing conductor openings 56, 66 and 76 (see FIGS. 7a to 7c), with the respective outgoing conductor sections 156, 166, 176 being arranged in the center of said barrier insulators. The barrier insulators 157, 167, 177 hold the respective outgoing conductor sections 156, 166, 176 and said outgoing conductor sections pass through said barrier insulators in order to enable a connection to parts of the switchgear assembly or bay which are located outside the housing 1. The outgoing conductor sections 156, 166, 176 extend at least in the region of the outgoing openings 56, 66, 76 in the outgoing normal plane E4, i.e. the (x-y) plane, which contains the second straight line 6 and is perpendicular to the second opening plane E2.

The busbar conductor sections 110, 120, 130 and the outgoing conductor sections 156, 166, 176 therefore leave the housing in single-phase (i.e. separate for each phase) openings 14, 24, 34, 16, 26, 36 and 56, 66, 76. These conductor sections pass through a respective single-phase insulator 115, 125, 135, 117, 127, 137 and 157, 167, 177 in the region of these housing openings. By virtue of the arrangement and orientation of the housing openings 14, 24, 34, 16, 26, 36 and 56, 66, 76, in each case also the arrangement and orientation of the connections of the busbar conductor sections 110, 120, 130 and the outgoing conductor sections 156, 166, 176 are predetermined, said conductor sections leaving the respective opening centrally and in the normal direction (i.e. along the respective mid-perpendicular of the opening). As a result, the advantages described herein with respect to the arrangement and orientation of the openings apply correspondingly also to the connections to the respective conductor sections arranged in the openings. The connections can be in the form of a threaded contact via threads and threaded holes or in the form of a plug-type contact.

The three outgoing conductor openings 56, 66, 76 define an outgoing normal plane E4. To be more precise, the outgoing normal plane E4 is defined by virtue of the fact that it is parallel to the mid-perpendiculars of the outgoing conductor openings 56, 66, 76. This definition is met by the outgoing normal plane E4 illustrated in FIG. 1a and by any plane parallel to the outgoing normal plane E4. The outgoing normal plane E4 illustrated in FIG. 1 is uniquely defined by the additional condition that the mid-perpendiculars of the outgoing conductor openings 56, 66, 76 are contained in the outgoing normal plane E4. This outgoing normal plane E4, which is uniquely fixed by the additional condition, is also referred to as the outgoing normal mid-plane. If properties and arrangements determined below with respect to the outgoing normal plane E4 are described, these apply to the outgoing normal mid-plane. The mid-perpendiculars are the normals to the openings, i.e. to opening planes along which the respective outgoing conductor openings 50, 60, 70 are arranged areally (each of these opening planes is in this case located in the second opening plane E2 described further above and shown in FIG. 1a), and run through the mid-point of the areas defined by the openings in these opening planes. The mid-point can be considered the center of gravity of the area defined in the respective opening plane. The mid-perpendiculars therefore run along the x direction in the outgoing normal plane E4 indicated in FIG. 1a.

Each of the outgoing conductor sections 156, 166, 176 extends, at least in the region of the respective one of the outgoing conductor openings 50, 60, 70, along the respective mid-perpendicular of this outgoing conductor opening, and therefore along the outgoing normal plane E4. The axes of the longitudinally extending outgoing conductor sections 156, 166, 176 extend in a common plane, which is equal to the outgoing normal plane E4 defined by the three outgoing conductor openings 56, 66, 76.

Each of the outgoing busbar connectors 150, 160, 170 has a respective switch disconnector 151, 161, 171 with a respective switch disconnection point 152, 162, 172. The first switch disconnector 151 connects optionally the first busbar conductor section 110 to the first outgoing conductor section 156 via the first disconnection point 152. Correspondingly, the second and third switch disconnectors 161, 171 also connect optionally the second and third busbar conductor sections 120, 130, respectively, to the second and third outgoing conductor sections 166, 176, respectively, via the second and third disconnection points 162, 172, respectively.

An actuating shaft 140, which is capable of rotating about an actuation axis 144 extending in the y direction, runs in the actuating shaft housing section 40. The actuation axis 144 lies in the outgoing normal plane E4. The actuating shaft 140 extends beyond each of the three switch disconnectors 151, 161, 171.

The switch contacts of these switches are formed by respective switching plungers (more generally switching elements) 153, 163, 173. The switching plungers 153, 163, 173 are capable of moving in a straight line along a switching direction (z direction) for switching purposes and are operatively connected to the actuating shaft 140 by a gear mechanism, for example a rack-and-pinion gear mechanism, with the result that the switching plungers 153, 163, 173 can be moved between an open position (as shown in FIGS. 6 to 7c) and a closed position (as shown in FIG. 8) longitudinally in the z direction by rotation of the actuating shaft 140. Each of the three switch disconnectors 151, 161, 171 is therefore capable of being opened and optionally produces an electrical contact between a respective one of the busbar conductor sections 110, 120, 130 and a respective one of the outgoing conductor sections 156, 166, 176. The switch disconnectors 151, 161, 171 are connected jointly to the actuating shaft 140, with the result that they are actuated jointly by the actuating shaft 140. Alternatively, the switch disconnectors 151, 161, 171 are also driven in each case by an individual actuating device.

An exemplary arrangement and orientation of various parts of the switchgear assembly module 2 are described in the present disclosure in relation to the outgoing normal plane E4 defined by the three outgoing conductor openings 56, 66, 76 and in particular to the outgoing normal plane E4. The disconnection points 152, 162 of the switch disconnectors 150, 160 are arranged on a first side of the outgoing normal plane E4, namely on the side below the outgoing normal plane E4. The disconnection point 172 of the switch disconnector 170, on the other hand, is arranged on a second side, which is opposite the first side, namely the upper side of the outgoing normal plane E4. The disconnection point of a switch disconnector is defined as the point, namely as the mid-point in the isolating distance between two subsequent conductor ends on both sides of an open switch (in this case, details such as disconnecting blades, which are in any case not provided in the present embodiment, are not taken into consideration). This arrangement has the advantage that, firstly, the disconnection points can be arranged relatively close to the outgoing normal plane E4 and therefore to the further parts arranged close to this plane, and nevertheless the distance between the disconnection points is increased. Owing to the increased distance, the isolating distances are shielded relatively effectively from one another without doing away with a compact design. Overall, this arrangement therefore enables good electrical shielding with at the same time a compact design.

An exemplary arrangement of further parts are described in the present disclosure with respect to the outgoing normal plane E4 and in particular towards the outgoing normal plane E4. The actuation axis 144 runs in the outgoing normal plane E4. The busbar conductor sections 110, 120, 130 extend parallel to the outgoing normal plane E4 and are arranged spatially outside the outgoing normal plane E4. To be more precise, the busbar conductor sections 110, 120, 130 are arranged spatially in such a way that the busbar conductor sections 120, 130 are arranged on the first (lower) side of the outgoing normal plane E4 and the busbar conductor section 110 is arranged on the second (upper) side of the outgoing normal plane E4. In other words, the busbar conductor sections 110, 120, 130 are arranged so as to be laterally offset with respect to the normal plane E4 and so as to run parallel to the normal plane E4. Each of the disconnection points 152, 162, 172 is therefore arranged on the same, i.e. the first or second, side of the outgoing normal plane E4 as the associated busbar conductor section 110, 120, 130.

Other planes can also be defined. All of these planes are equivalent to the outgoing normal plane E4 in the embodiments illustrated in the figures, but can be dissimilar in other exemplary embodiments. A further switch disconnector plane which is identical to the outgoing normal plane E4 can be defined as follows, for example: when viewing the straight connecting line which runs perpendicular to the actuation axis 144 between the disconnection point 152 and the actuation axis 144, the switch disconnector plane is defined by virtue of the fact that it is aligned perpendicular to the straight connecting line and contains the actuation axis 144. Similarly, further switch disconnector planes, which are likewise equivalent to the outgoing normal plane E4, can be defined via the straight connecting lines, which run perpendicular to the actuation axis 144 between the disconnection points 162 or 172, and the actuation axis 144. This describes the arrangement of the various parts with respect to the outgoing normal plane E4 defined by the three outgoing conductor openings 56, 66, 76. Correspondingly, however, the switch disconnector planes and/or the outgoing normal plane can also be used instead of the outgoing normal plane E4. In the embodiment shown here, there is no difference between the two since all of these planes are equivalent to an outgoing normal plane E4, namely the outgoing normal plane E4.

If the exemplary switchgear assembly module 2 illustrated in FIGS. 6 to 8 is integrated in a substation (also referred to as switchgear assembly), it forms part of a busbar module. The busbar conductor sections 110, 120, 130 in this case form part of a busbar of the switchgear assembly. This busbar can be single-phase-encapsulated, at least in sections, in regions outside the switchgear assembly module 2. The busbar conductors each extend in the y direction, with the result that the busbar also lies in the busbar plane (y-z plane) outside the module 2.

The switchgear assembly module illustrated in FIGS. 1*a* to 8 can be varied in numerous ways. It is thus also possible, for example, for the second busbar openings not to be designed to be mirror images of the first busbar openings, but to be arranged differently with respect to the first busbar openings. In general, the second busbar openings can also be positioned opposite the first busbar openings, for example at an angle. Also, the second straight line 6 can also be inclined differently with respect to the first straight line 4 than at a right angle, for example it can have an angle of 45°. In a further variant, it is also possible for post insulators, i.e. more generally insulators, to be used instead of the barrier insulators at the busbar openings and/or at the outgoing conductor openings. In another exemplary embodiment, it is possible for no insulators to be used at all and for the corresponding conductors to be supported, for example by means of post insulators positioned in the housing. In yet another embodiment, the switching pieces of the switch disconnectors are not driven via a common actuating shaft, but in each case via a separate actuating shaft. These separate actuating shafts can also extend, for example in the z direction, from one end of the respective outgoing housing section (corresponding to the ends 52, 62, 72 in FIG. 1*a*) towards the switch. Optionally, a respectively dedicated drive can be provided for each of the separate actuating shafts. Instead of switch disconnectors with switching plungers, it is also possible for switch disconnectors with possibly pivottable disconnecting blades to be used.

An exemplary embodiment of the present disclosure includes a housing for a switchgear assembly module of switchgear assembly, to be precise a switch bay of a substation. The housing forms a common gas space suitable for accommodating an insulating gas and three gas-insulated busbar conductor sections of the switchgear assembly module and (at least) includes three first busbar openings for separately accommodating a respective one of three busbar conductors of the switchgear assembly, i.e. the busbar openings could also be referred to as busbar conductor openings. In this case, accommodating separately means that the busbar conductors are each arranged in single-phase fashion in the respective openings, in particular are arranged to pass through a single-phase insulator, where the term "single-phase" insulator is understood to mean an electrical insulator through which only one single nominal conductor is passed. The three first busbar openings are arranged areally in a first opening plane and along a first straight line, i.e. the rims of the three first busbar openings define respective opening areas. These opening areas each lie areally in the first opening plane. Respective centers of the opening areas lie on the first straight line. The housing further includes (at least) three second busbar openings or busbar conductor openings for separately accommodating a respective one of the three busbar conductors. The three second busbar openings are arranged on a side of the housing, which is opposite the three first busbar openings. In this case, a mutually opposing arrangement can also mean mutually opposing at an angle. In this case, mutually opposing means that the openings are oriented differently, in particular can be oriented differently through 180°, and that a connecting line between one of the first busbar openings and one of the second busbar openings passes through at least a piece of the housing interior. The housing furthermore includes (at least) three outgoing conductor openings for separately accommodating a respective one of three outgoing conductors, to be more precise outgoing nominal conductors of the switchgear assembly. The three outgoing conductor openings are arranged areally in a second opening plane and along a second straight line. The three first or second busbar openings form a first or second busbar connection group, and the three outgoing conductor openings form an outgoing conductor connection group.

In another exemplary embodiment, a housing for a switchgear assembly module of a switchgear assembly, where the switchgear assembly includes at least one busbar with three busbar conductors, and where the housing forms a gas space for accommodating an insulating gas for the switchgear assembly module and comprises: a first busbar connection group with three first busbar openings for separately accommodating a respective one of the three busbar conductors, wherein the three first busbar openings are arranged along a first straight line such that the respective mid-perpendiculars lie jointly in a busbar normal plane with respect to each of the three first busbar openings; a second busbar connection group with three second busbar openings for separately accommodating a respective one of the three busbar conductors, wherein the three second busbar openings are arranged on a side of the housing which is opposite the three first busbar openings; and an outgoing conductor connection group with three outgoing conductor openings for separately accommodating a respective one of three outgoing nominal conductors of the switchgear assembly, wherein the three outgoing conductor openings are arranged along a second straight line such that the respective mid-perpendiculars lie in a common outgoing normal plane with respect to each of the three outgoing conductor openings, wherein the second straight line runs substantially perpendicular to the first straight line.

In other exemplary embodiments (i.e. in accordance with an advantageous, but non-essential aspect of the present disclosure, the second straight line runs inclined with respect to the first straight line (i.e. not parallel; the straight lines can intersect one another or be skewed with respect to one another). The second straight line runs perpendicular to the first straight line. Exemplary embodiments are also possible, in which the second straight line runs parallel to the first straight line. In further exemplary embodiments, the second opening plane extends at right angles to the first opening plane. This perpendicular arrangement of the second straight line or opening plane with respect to the first straight line or opening plane results in advantages, in particular as regards the versatility in use of the busbar housing in a GIS.

In accordance with another embodiment, the first straight line, the second straight line, the first opening plane or the second opening plane run in accordance with at least one of the following arrangements: (a) the second opening plane is arranged transversely, in exemplary embodiments perpendicular, to the first opening plane; (b) the second straight line (6) is offset with respect to the first straight line in such a way that the first and second straight line do not intersect one another; (c) the second straight line runs in inclined fashion, in exemplary embodiments perpendicular, to the first opening plane; and/or (d) the first straight line runs parallel to the second opening plane.

The internal volume of the housing forms a continuous gas space, wherein the three first busbar openings, the three second busbar openings and the three outgoing conductor openings each provide or form a separate entrance to the gas space from outside the housing. The gas space is therefore connected to the three first and second busbar openings and to the three outgoing conductor openings. The three second busbar openings are arranged areally in a third opening plane and along a third straight line, wherein the third opening plane is parallel to the first opening plane and the third straight line is parallel to the first straight line. In particular, each of the three second busbar openings can be arranged in pairs with respect to a respective one of the three first busbar openings and can form a respective busbar opening pair therewith so as to accommodate a respective continuous straight busbar conductor section therebetween, the straight busbar conductor section in particular extending perpendicular to the first and third opening plane. Each of the three first busbar openings with the respective one of the three second busbar openings limits a cylindrical gas space section of the gas space at the ends, which gas space section extends between said busbar openings. The cylindrical gas space sections extend in each case along a straight longitudinal axis. The cross section of the gas space sections can be circular, oval or non-uniform, for example.

A housing outer surface is designed to be at least partially constricted with respect to a convex envelope. The envelope describes the global shape of the housing outer surface without taking into consideration local elements such as screws, handles etc. which are irrelevant for this shape. The envelope is understood to mean that form which results when a tensioned film is wound around the housing, wherein the film defining the envelope would in each case only rest on the projections, for example the contour of the flange-like adapter sections and the like. The housing outer surface therefore has concave depressions with respect to the envelope. These depressions can be provided in a transition region between the first or the second busbar openings and the outgoing conductor openings and/or in a transition region between the first busbar openings and the second busbar openings.

The respective centers of the three first busbar openings are arranged in a row along the first straight line at a uniform unit distance with respect to one another. The respective centers of the three outgoing conductor openings can be arranged in a row along the second straight line at the unit distance from one another and/or the respective centers of the three second busbar openings can be arranged in a row along a third straight line at the unit distance from one another. An outgoing normal plane, which is perpendicular to the second opening plane and contains the second straight line, is arranged between an outer and a central one of the first busbar openings and is arranged in particular centrally between these busbar openings. The housing comprises metal, in particular aluminum. In accordance with one aspect, the housing is a casting, in particular is cast-molded.

An orthogonal x-y-z reference system is defined by virtue of the fact that the first straight line defines the z direction. In accordance with one aspect, the second straight line defines a y direction which is perpendicular to the z direction, and therefore also an x direction which is perpendicular to the z and y direction. In accordance with one aspect, the second straight line is offset with respect to the first straight line of the x direction with the result that the first and second straight lines do not intersect one another. In accordance with one aspect, the third straight line is parallel to the z direction. In accordance with one aspect, the first opening plane is parallel to the z and y direction. In accordance with one aspect, the second opening plane is parallel to the x and y direction.

In another embodiment, the housing includes three busbar housing sections in the form of cylinder sections, wherein the three first and optionally also the second busbar openings are arranged on an end face of a respective one of the busbar housing sections, and wherein the three busbar housing sections are arranged in particular spaced apart from one another, i.e. the distance between the cylinder axes is greater than the cylinder diameter of the busbar housing sections, wherein the cylinder diameter is predetermined by the housing outer side. In accordance with one aspect, the three busbar housing sections are arranged in a row along the first straight line in the z direction at a uniform distance from one another. The busbar housing sections in the form of cylinder sections define a cylindrical busbar internal volume. The cylinder axis extends in the y direction.

In exemplary embodiments, the first busbar connection group includes, for each of the three first busbar openings, in each case one protruding tube stump, which opens out at the respective one of the first busbar openings. The second busbar connection group comprises, for each of the three second busbar openings, in each case one protruding tube stump, which opens out into the respective one of the second busbar openings. The first busbar openings and/or the second busbar openings and/or the outgoing openings are arranged on an end face of the respective tube stump. Depending on the specifications and the exemplary embodiment, the tube stumps are spaced apart from one another, i.e. are not fused with one another, or are fused with one another.

In accordance with an embodiment of the present disclosure, the first busbar connection group includes, for each of the three first busbar openings, in each case one flange which surrounds the respective opening circumferentially, wherein the flange is optionally accessible from a region behind the opening and outside the housing. The flanges of the first busbar openings and/or the second busbar openings and/or the outgoing openings are fully or partially integrated in a common wall section of a main chamber of the housing, depending on the embodiment, or are spaced apart from a wall section of the main chamber by the tube stump and are configured as independent flanges. Depending on the embodiment, all of the flanges of the first busbar openings and/or the second busbar openings and/or the outgoing openings are configured separately and spaced apart from one another, or at least two of the flanges are connected to one another to form a flange group. For example, all of the flanges of the first busbar openings and/or the second busbar openings and/or the outgoing openings can be connected to one another to form a respective first busbar flange group and/or second busbar flange group and/or outgoing flange group.

In another embodiment, the first or second busbar openings are each directed towards the y direction, i.e. the normal of said busbar openings extends in the y direction. Thus, the mutually parallel normals of the openings span a busbar plane (y-z plane), with the result that nominal conductors leaving the openings centrally and perpendicular lie in the y-z plane. The busbar openings are surrounded by flanges. The flanges lie in a common plane, an x-z plane. Each of the three busbar openings has a dedicated separate flange. The flange is in particular provided with a fastening device for a barrier insulator. The fastening device includes in particular apertures formed in the flange for fastening screws.

In an exemplary embodiment of the present disclosure, the housing includes three outgoing conductor housing sections, wherein the three outgoing conductor openings are arranged on a respective one of the three outgoing conductor housing sections. At least one of the three outgoing conductor housing sections connects the internal volumes of in each case at least two of the three busbar housing sections of the gas space fluidically to one another. Each of the three outgoing conductor housing sections connects the internal volumes of in each case at least two of the busbar housing sections to one another. At least one of the three outgoing conductor housing sections connects the internal volumes of the three busbar housing sections to one another. Each of the three outgoing conductor housing sections connects the internal volumes of the three busbar housing sections to one another.

A first outgoing conductor housing section of the three outgoing conductor housing sections connects the three busbar housing sections directly and fluidically to one another, and a second outgoing conductor housing section connects only two of the three busbar housing sections directly and fluidically to one another, and a third outgoing conductor housing section is merely connected fluidically and directly to a single one of the three busbar housing sections, or else the third outgoing conductor housing section also connects the three busbar housing sections directly and fluidically to one another. The first outgoing conductor housing section is arranged next to the first busbar openings, the second outgoing conductor housing section is arranged centrally, and the third outgoing conductor housing section is arranged next to the second busbar openings. One of the three outgoing conductor housing sections, the one which is next to the first busbar openings, connects the three busbar housing sections fluidically to one another and/or a centrally arranged one of the three outgoing conductor housing sections connects merely two of the three busbar housing sections fluidically to one another and/or one of the three outgoing conductor housing sections which is next to the second busbar openings is connected directly only to a single one of the three busbar housing sections fluidically.

In an exemplary embodiment of the present disclosure, the outgoing conductor housing sections are in the form of cylinder sections and have a cylindrical internal volume. The outgoing conductor housing sections are spaced apart from one another. The distance between their cylinder axes or centers is greater than the cylinder outer diameter or than twice the radius of curvature of their wall sections. The outgoing conductor housing sections are arranged at a uniform distance from one another along the second straight line. In accordance with one aspect, the cylinder axes of the outgoing conductor housing sections extend in the x direction. Respective closed termination pieces are fitted on a respective end side of the outgoing conductor housing sections.

In accordance with an exemplary embodiment of the present disclosure, the outgoing conductor connection group includes, for each of the three outgoing conductor openings, in each case one flange which surrounds the respective outgoing conductor opening circumferentially, wherein the flange is optionally accessible from a region behind the outgoing conductor opening and outside the housing. The outgoing conductor openings are each directed towards a direction, which is perpendicular to the first and second straight lines, or are directed towards a direction, which is perpendicular to the second opening plane. The normal of the outgoing conductor openings extends in the x direction. Therefore, the outgoing conductor openings span an outgoing normal plane (from a plane spanned by the second straight line and the mutually parallel normals of the openings), with the result that nominal conductors which leave the outgoing conductor openings centrally and perpendicular, lie in the outgoing normal plane. The outgoing normal plane may be an x-y plane.

In an exemplary embodiment disclosure herein, the outgoing normal plane intersects a busbar normal plane, which is formed correspondingly by the busbar openings, in a line of intersection which is offset with respect to each of the mid-axes of the busbar openings in the z direction. In particular, the line of intersection is arranged outside the busbar openings, in particular between two of the busbar openings.

In accordance with an exemplary embodiment, the outgoing conductor openings are surrounded by flanges. The flanges lay in a common plane, for example a y-z plane. Each of the three outgoing conductor openings has a dedicated separate flange. The flange is in particular provided with a fastening device for a barrier insulator. The fastening device includes in particular apertures formed in the flange for fastening screws.

The housing has at least one aperture, which passes through a continuous internal volume defined by the housing. In accordance with one aspect, the aperture also passes through the outer envelope of the housing. The aperture is arranged between two, in particular an outer one and a central one, of the busbar housing sections. In an embodiment of the present disclosure, the aperture is arranged between two, in particular the two outer ones, of the outgoing conductor housing sections. In accordance with another embodiment, the housing has a large number of apertures, for example two or three apertures.

In one exemplary embodiment, the housing includes a cooling device for increasing the heat dissipation from the internal volume of the housing. In accordance with one aspect, the cooling device is arranged on a termination piece of the outgoing conductor housing section, such as on an upper termination piece, for example. The housing includes at least one cylindrical actuating shaft housing section for accommodating an actuating shaft. The actuating shaft is designed for actuating switching elements, which are or can be arranged in the internal volume of the housing. The actuating shaft housing section extends along the three outgoing conductor housing sections and provides an internal volume, which is directly connected to the interior of the outgoing conductor housing sections, for an actuating shaft extending along a straight line. The actuating shaft housing section can extend along the three outgoing conductor housing sections and provide an internal volume, which is connected directly to the interior of the outgoing conductor housing sections, for a straight actuating shaft. A cylinder axis of the actuating shaft housing section extends in the y direction or parallel to the second straight line. The actuating shaft housing section is arranged to be offset in the x direction with respect to the cylinder axes of the busbar housing sections. The offset is half the distance between the cylinder axes of the busbar housing sections.

In another embodiment, the housing has symmetry properties. Many of the openings having the first busbar openings, the second busbar openings and the outgoing openings are arranged in mirror-symmetrical fashion with respect to a mirror plane, and the mirror plane is arranged parallel to the first opening plane. The housing is designed to be substantially mirror-symmetrical with respect to the mirror plane. Substantially mirror-symmetrical means symmetry with respect to the busbar and outgoing openings and with respect to the main geometry of the housing, but not with respect to any auxiliary connections and other non-essential details. Expressed quantitatively, the volume of the gas space, which is not overlapping when mirrored, should not be more than 5% of the total volume of the gas space. In an exemplary embodiment, the mirror plane of the housing runs through a central outgoing conductor opening, which is arranged between the two remaining outgoing conductor openings.

In an exemplary embodiment of the present disclosure, the housing is designed for a switching module of a high-voltage switchgear assembly, i.e. for voltages of at least 480 kV, for example. The distance between the centers of the busbar openings is at least 80 cm, for example.

Another exemplary embodiment provides a switchgear assembly module having a housing. The switchgear assembly module also includes a busbar conductor section having three busbar phase conductors, which each extend from a respective one of the first busbar connection openings to a respective one of the second busbar connection openings; and an outgoing conductor section having three outgoing phase conductors, which each extend towards a respective one of the second outgoing connection openings. The switchgear assembly module further includes a switch disconnector system with three switch disconnectors, wherein each of the three switch disconnectors switches an electrical contact between a respective one of the busbar phase conductors and a respective one of the outgoing phase conductors. The switch disconnector system includes an actuation system for jointly actuating the three switch disconnectors.

The actuation system can include an actuating shaft. The actuating shaft extends along the actuating shaft housing section. In accordance with one aspect, the busbar phase conductors extend in a busbar plane (y-z plane or the plane which contains the first straight line and which is perpendicular to the first opening plane), at least in the region of the first and the second busbar openings. In accordance with one aspect, the outgoing phase conductors extend in an outgoing normal plane (x-y plane or the plane which contains the second straight line and which is perpendicular to the second opening plane), at least in the region of the outgoing conductor openings.

In an exemplary embodiment of the present disclosure, a switch bay can include any switchgear assembly module described herein. The switch bay can also include a busbar conductor section having three busbar phase conductors, which each extend from a respective one of the first busbar connection openings to a respective one of the second busbar connection openings; and an outgoing conductor section having three outgoing phase conductors, which each extend towards a respective one of the second outgoing connection openings. The switch bay further includes a switch disconnector system with three switch disconnectors, which can be opened, wherein each of the three switch disconnectors produces an electrical contact between a respective one of the busbar phase conductors and a respective one of the outgoing phase conductors.

In another embodiment, a switchgear assembly (substation) can include any switchgear assembly module described herein. The switchgear assembly also includes at least one busbar, wherein the busbar conductor section forms a longitudinal section of the busbar. At least sections of the busbar are single-phase-encapsulated. At least sections of the outgoing nominal conductors are single-phase-encapsulated. The busbar conductors each extend in the y direction, with the result that the busbar spans a y-z plane. The outgoing nominal conductors extend in an x direction, which is perpendicular to the y and z direction, with the result that the outgoing conductors span an x-y plane.

In another embodiment a switchgear assembly which includes a switchgear assembly module in accordance with any of the embodiments and aspects described herein and at least one (gas-insulated, encapsulated) busbar, wherein the busbar has the busbar conductor section or the busbar conductor sections form, with the associated busbar housing section, a longitudinal section of the busbar. The busbar extends over at least two switchgear assembly modules (which are adjacent depending on the embodiment) in accordance with any embodiments described herein.

The statement relating to the fact that the housing includes three outgoing conductor openings does not exclude the possibility of it also having further outgoing conductor openings, for example in total four or six outgoing conductor openings. As far as it is not expressly stated otherwise, a given number can designate a minimum number, or precisely the stated number as desired. For example, "three outgoing conductor openings" then means "precisely three outgoing conductor openings". The same applies to the number of outgoing conductors and the first and second busbar openings and conductors.

In one exemplary embodiment as switchgear assembly module for a switchgear assembly has a housing, which forms a common gas space for accommodating an insulating gas for the switchgear assembly module. The switchgear assembly module includes a busbar conductor arrangement comprising three busbar conductor sections, which are accommodated in the common gas space and in particular extend in a y direction; an outgoing conductor connection group with three outgoing conductor openings, in particular for separately accommodating in each case one of three outgoing conductors, more precisely outgoing conductor sections of the switchgear assembly, and with three outgoing conductor sections, which are in particular accommodated in the common gas space, extend transversely with respect to the y direction in an x direction, and extend towards a respective one of the outgoing conductor openings (for example from an interior of the housing and/or from the busbar conductor arrangement); and three switch disconnectors, which each connect a respective one of the busbar conductor sections to a respective one of the outgoing conductor sections via a disconnection point.

The three outgoing conductor openings define an outgoing normal plane, which is parallel to the mid-perpendiculars of the outgoing conductor openings. An outgoing normal plane, also referred to as outgoing normal central plane, is defined as the plane, which contains the mid-perpendiculars of the outgoing conductor openings. The mid-perpendiculars are the normals to the openings, i.e. to opening planes along which the respective outgoing conductor openings are arranged areally and run through the center point of the areas defined by the openings in these opening planes. If the openings do not have a center point, the mid-perpendiculars are defined as the normals, which run through the center of gravity of the areas, which are defined in the opening planes.

The disconnection points are arranged spatially in such a way that at least the disconnection point of a first one of the switch disconnectors is arranged on a first side of the outgoing normal plane and the disconnection point of a second one of the switch disconnectors is arranged on a second side, which is opposite the first side, of the switch disconnector plane, i.e. (any) outgoing normal plane is provided which meets this condition. Everything, which has been mentioned herein with respect to the outgoing normal plane, applies in particular to the outgoing normal central plane in accordance with one aspect of the invention.

In another embodiment of the present disclosure a switchgear assembly module for a switchgear assembly has a housing, which forms a gas space for accommodating an insulating gas for the switchgear assembly module. The switchgear assembly module includes a busbar conductor arrangement comprising three busbar conductor sections, which in particular extend in a y direction; an outgoing conductor arrangement comprising three outgoing conductor sections, which extend in particular transversely with respect to the y direction in an x direction; three switch disconnectors, which each connect one of the busbar conductor sections to a respective one of the outgoing conductor sections via a disconnection point; and an actuating shaft for actuating the switch disconnectors, which actuating shaft has an actuation axis, which extends in particular in a y direction.

The disconnection points and the actuation axis are arranged spatially in such a way that at least the disconnection point of a first one of the switch disconnectors is arranged on a first side of a switch disconnector plane and the disconnection point of a second one of the switch disconnectors is arranged on a second side, which is opposite the first side, of the switch disconnector plane. The switch disconnector plane is fixed as follows by the actuation axis and by a straight connecting line, which runs perpendicular to the actuation axis between a disconnection point and the actuation axis or connects the disconnection point and the actuation axis; the switch disconnector plane is aligned perpendicular to the straight connecting line and contains the actuation axis.

The switch disconnector plane can also be defined by a straight connecting line, which runs perpendicular to the actuation axis between a disconnection point and the actuation axis, and the actuation axis, namely by virtue of the fact that the switch disconnector plane is aligned perpendicular to the straight connecting line and contains the actuation axis.

In another exemplary embodiment, the disconnection points of two switch disconnectors are arranged on the first side of the outgoing normal plane. The outgoing normal plane contains the mid-perpendiculars of at least two of the outgoing conductor openings. The outgoing normal plane can contain the mid-perpendiculars of each of the outgoing conductor openings.

In accordance with an exemplary embodiment, a first one of the switch disconnectors connects a first one of the busbar conductor sections to a first one of the outgoing conductor sections, a second one of the switch disconnectors connects a second one of the busbar conductor sections to a second one of the outgoing conductor sections, and a third one of the switch disconnectors connects a third one of the busbar conductor sections to a third one of the outgoing conductor sections. The first busbar conductor section is arranged on the outside, the second busbar conductor section is arranged in the center, and the third busbar conductor section is arranged on the outside. The first outgoing conductor section is arranged on the outside, the second outgoing conductor section is arranged in the center, and the third outgoing conductor section is arranged on the outside.

In accordance with another embodiment, the switchgear assembly modules include an actuating shaft for actuating the switch disconnectors, which actuating shaft has an actuation axis, which extends in particular in a y direction, or extends along said actuation axis and in particular is capable of rotating about said actuation axis. A straight connecting line is defined as the shortest connection between one of the disconnection points and the actuation axis.

The disconnection point of a switch disconnector is defined as a point, namely as the center point of the isolating distance between two subsequent conductor ends on both sides of an open switch. Each switch disconnector plane, which is fixed in each case by such a straight connecting line and the actuation axis and which in each case is aligned perpendicular to the straight connecting line and contains the actuation axis can include at least the disconnection point of a first one of the switch disconnectors arranged on a first side of the switch disconnector plane; and the disconnection point of a second one of the switch disconnectors arranged on a second side, which is opposite the first side, of the switch disconnector plane.

A further outgoing normal plane, also referred to as the actuation axis plane, is the outgoing normal plane, which contains the actuation axis. The respective definitions and statements regarding the outgoing normal plane which is defined by the outgoing conductor openings also apply, for example, to the switch disconnector plane and/or to the further outgoing normal plane and/or to the outgoing normal plane and/or to the actuation axis plane. The actuation axis runs in the outgoing normal plane, such as the further outgoing normal plane.

In accordance with another embodiment, the busbar conductor sections extend parallel to the outgoing normal plane. The busbar conductor sections are arranged spatially outside the outgoing normal plane, in particular the outgoing normal plane. The busbar conductor sections are arranged spatially in such a way that at least a first one of the busbar conductor sections is arranged on the first side of the outgoing normal plane and at least a second one of the busbar conductor sections is arranged on the second side, which is opposite the first side, of the outgoing normal plane. The at least one first one of the busbar conductor sections has two busbar conductor sections.

Each of the busbar conductor sections forms a pair with the respective disconnection point connected thereto. Each of the disconnection points is arranged on the same side, i.e. the first or second side, of the outgoing normal plane as the busbar conductor section associated with the respective pair. Each of the busbar conductor sections is therefore arranged on the same side of the outgoing normal plane as the respective disconnection point connected thereto. In accordance with one aspect, each of the outgoing conductor sections extends along the outgoing normal plane or the outgoing normal plane, at least in the region of the outgoing conductor openings.

In another exemplary embodiment, at least one of the switch disconnectors has a switching element, which is capable of moving in a straight line along a switching direction for switching purposes. This switching direction runs transversely, i.e. not parallel, to the outgoing normal plane or even runs perpendicular to the outgoing normal plane or runs in the z direction or along the straight connecting line. The switching direction is parallel to the first or the second opening plane. The switchgear assembly module includes an actuating shaft for actuating the switching elements, wherein the actuating shaft is connected to the switching element via a gear mechanism, in particular via a gear mechanism for converting a rotary movement into a linear movement, for example a rack-and-pinion gear. The actuating shaft has an actuation axis, which extends in a y direction, for example. The three switch disconnectors are designed to be identical to one another, at least as regards their respective male switching part. In accordance with one aspect, the three switch disconnectors each have identically designed switching plungers and/or a largely identical switching plunger housing. By using these identical parts, it is possible to simplify processes and reduce costs both during manufacture and during maintenance and repair work.

In an embodiment of the present disclosure, the switchgear assembly module includes a common actuating shaft for actuating each of the switch disconnectors, which actuating shaft has an actuation axis which extends in particular in a y direction. A straight connecting line along a shortest connection between a respective one of the disconnection points and the actuation axis is defined for each of the switch disconnectors. The straight connecting line runs substantially perpendicular to the outgoing normal plane. The isolating distance runs transversely, in particular substantially perpendicular, to the outgoing normal plane, for each of the switch disconnectors.

The gas space is a continuous, common gas space, and the three busbar conductor sections and the three outgoing conductor sections are arranged in the common gas space. Furthermore at least one continuous piece or section of the actuating shaft, which piece or section extends beyond the three switch disconnectors, is arranged in the common gas space.

A respective isolating distance runs parallel to the first and/or third opening plane, for each of the switch disconnectors. The isolating distance is defined in such a way that it runs between two adjacent conductor ends on both sides of the respective open switch. A respective outgoing busbar connector extends along a respective busbar conductor section plane, between each of the disconnection points and the respective busbar conductor section, wherein the busbar conductor section planes are arranged so as to run parallel to one another, and in exemplary embodiments, are parallel to the first opening plane and the third opening plane and are arranged therebetween. The busbar conductor section planes IIIa, IIIb, IIIc in this case extend (as shown in FIG. 2a) parallel to the first plane E1, for example. The fact that the outgoing busbar connectors extend along a respective plane means that the central line or neutral fibers of the outgoing busbar connectors is arranged in this plane. Conductor shapes are used which are arranged in one plane in order to pass the current phases past one another, instead of the conductors which are otherwise marketed which run completely in three dimensions with a neutral fiber which is not flat. Such conductor shapes, which run completely in three dimensions, are complex in terms of manufacture (mold-casting) and fitting, and it is therefore an improvement that the housing enables flat conductor shapes.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List Of Reference Symbols:

1 Housing for switchgear assembly module
2 Switchgear assembly module
3 Gas space/chamber
4 First straight line (straight line in z direction for first busbar openings)
4' Third straight line (straight line in z direction for second busbar openings)
6 Second straight line (straight line in y direction for conductor outgoing openings)
8 Hole/aperture
9 Enveloping square
10 Upper busbar housing section
12 Cylindrical housing section 12a, 12b Tube stumps
14 Upper busbar opening
14a Normal
15 Flange
16 Upper busbar opening
17 Flange
20 Central busbar housing section
22 Cylindrical housing section
22a, 22b Tube stumps
24 Central busbar opening
24a Normal
25 Flange
26 Central busbar opening
27 Flange
30 Lower busbar housing section
32 Cylindrical housing section
32a, 32b Tube stumps
34 Lower busbar opening
34a Normal
35 Flange
36 Lower busbar opening
37 Flange
40 Actuating shaft housing section
42 Actuating shaft opening
50 Lateral conductor outgoing housing section
52 Upper end piece of conductor outgoing housing section
53 Cylindrical housing section
53a Tube stump
54 Lower transition piece
56 Lateral conductor outgoing opening
57 Flange
60 Central conductor outgoing housing section
62 Upper end piece of conductor outgoing housing section
63 Cylindrical housing section
63a Tube stump
65 Lower end piece of conductor outgoing housing section
66 Central conductor outgoing opening
67 Flange
70 Lateral conductor outgoing housing section
72 Upper end piece of conductor outgoing housing section
73 Cylindrical housing section
73a Tube stump
74 Lower transition piece
76 Lateral conductor outgoing opening
77 Flange
82 Cooling ribs
91, 92a, 92b Entrance, inspection window
110, 120, 130 Busbar nominal conductors
114, 124, 134 Ends of busbar conductor sections
115, 125, 135 Insulator
140 Actuating shaft
144 Actuation axis
150, 160, 170 Outgoing busbar connector
151, 161, 171 Switch disconnector
152, 162, 172 isolating distance
153, 163, 173 Switching plunger
156, 166, 176 Outgoing nominal conductor sections
E1 First opening plane
E2 Second opening plane
E3 Third opening plane
E4 Outgoing normal plane

What is claimed is:

1. A switchgear assembly module for a switchgear assembly with a housing, which forms a common gas space for accommodating an insulating gas for the switchgear assembly module, the switchgear assembly module comprising:
   a busbar conductor arrangement having three busbar conductor sections, which are accommodated in the common gas space;
   an outgoing conductor connection group with three outgoing conductor openings and with three outgoing conductor sections, which extend from within the housing towards a respective one of the outgoing conductor openings; and
   three switch disconnectors, which each connect a respective one of the busbar conductor sections to a respective one of the outgoing conductor sections via a disconnection point,
   wherein an outgoing normal plane is defined by the three outgoing conductor openings and is parallel to mid-perpendiculars of the outgoing conductor openings, and
   wherein the disconnection points are arranged spatially in such a way that at least the disconnection point of a first one of the switch disconnectors is arranged on a first side of the outgoing normal plane and the disconnection point of a second one of the switch disconnectors is arranged on a second side, which is opposite the first side, of the outgoing normal plane.

2. The switchgear assembly module as claimed in claim 1, wherein the outgoing normal plane contains the mid-perpendiculars of at least two, possibly of each of the outgoing conductor openings.

3. A switchgear assembly module for a switchgear assembly with a housing, which forms a gas space for accommodating an insulating gas for the switchgear assembly module, the switchgear assembly module comprising:
   a busbar conductor arrangement having three busbar conductor sections;
   an outgoing conductor arrangement having three outgoing conductor sections;
   three switch disconnectors, which each connect one of the busbar conductor sections to a respective one of the outgoing conductor sections via a disconnection point; and
   an actuating shaft for actuating the switch disconnector, which actuating shaft extends along an actuation axis,
   wherein a switch disconnector plane is fixed by a connecting straight line, which connecting straight line is perpendicular to the actuation axis and connects one of the disconnection points to the actuation axis, and the actuation axis,
   wherein the switch disconnector plane is aligned perpendicular to the connecting straight line and contains the actuation axis, and
   wherein the disconnection points and the actuation axis are arranged spatially such that at least the disconnection point of a first one of the switch disconnectors is arranged on a first side of the switch disconnector plane and the disconnection point of a second one of the switch disconnectors is arranged on a second side, which is opposite the first side, of the switch disconnector plane.

4. The switchgear assembly module as claimed in claim 1, wherein the busbar conductor sections extend parallel to the outgoing normal plane.

5. The switchgear assembly module as claimed in claim 1, wherein the busbar conductor sections are arranged spatially outside the outgoing normal plane.

6. The switchgear assembly module as claimed in claim 1, wherein the busbar conductor sections are arranged spatially in such a way that at least a first one of the busbar conductor sections is arranged on the first side of the outgoing normal plane and at least a second one of the busbar conductor sections is arranged on the second side, which is opposite the first side, of the outgoing normal plane.

7. The switchgear assembly module as claimed in claim 1, wherein each of the busbar conductor sections is arranged on the same side of the outgoing normal plane as the respective disconnection point which is connected thereto.

8. The switchgear assembly module as claimed in claim 1, wherein each of the outgoing conductor sections extends along the outgoing normal plane, at least in the region of the outgoing conductor openings.

9. The switchgear assembly module as claimed in claim 1, wherein the outgoing conductor sections extend parallel to one another.

10. The switchgear assembly module as claimed in claim 1, wherein at least one of the switch disconnectors has a switching element which is capable of moving in a straight line along a switching direction for switching purposes, wherein in embodiments, the switching direction runs transversely, in particular perpendicular, to the outgoing normal plane.

11. The switchgear assembly module as claimed in claim 1, wherein the three switch disconnectors are designed to be identical to one another, at least with respect to their respective male switching part.

12. The switchgear assembly module as claimed in claim 1, further comprising:
  a common actuating shaft for actuating each of the switch disconnectors, wherein the actuating shaft has an actuation axis.

13. The switchgear assembly module as claimed in claim 12, wherein the actuation axis runs in the outgoing normal plane.

14. The switchgear assembly module as claimed in claim 1, comprising:
  an actuating shaft for actuating the switching element, wherein the actuating shaft has an actuation axis and is connected to the switching element via a gear mechanism.

15. The switchgear assembly module as claimed in claim 12, wherein an isolating distance runs substantially perpendicular to the outgoing normal plane for each of the switch disconnectors.

16. The switchgear assembly module as claimed in claim 1, wherein the common gas space is continuous, wherein the three busbar conductor sections, and the three outgoing conductor sections are arranged in the common gas space, and wherein in embodiments, at least one continuous section of the actuating shaft, which section extends beyond the three switch disconnectors is arranged in the common gas space.

17. The switchgear assembly module as claimed in one claim 1, wherein the housing of the switchgear assembly module comprises:
  three first busbar openings, in which first busbar openings of a respective one of the busbar conductor sections are accommodated separately, wherein the three first busbar openings are arranged areally in a first opening plane and along a first straight line;
  three second busbar openings, in which second busbar openings of a respective one of the busbar conductor sections are accommodated separately, wherein the three second busbar openings are arranged on a side of the housing which is opposite the three first busbar openings; and
  wherein the three outgoing conductor openings are arranged areally in a second opening plane and along a second straight line.

18. The switchgear assembly module as claimed in claim 17, wherein the second straight line is inclined with respect to the first straight line.

19. The switchgear assembly module as claimed in claim 18, wherein the second straight line is perpendicular to the first straight line.

20. The switchgear assembly module as claimed in claim 17, wherein the first straight line, the second straight line, the first opening plane or the second opening plane run in accordance with at least one of the following arrangements:
  the second opening plane is arranged transversely, in particular perpendicular, to the first opening plane;
  the second straight line is offset with respect to the first straight line such that the first and the second straight line do not intersect one another and the second opening plane extends parallel to a plane which emerges from the first plane through a 90 degree rotation about the first straight line;
  the second straight line is inclined to the first opening plane; and/or
  the first straight line runs parallel to the second opening plane.

21. The switchgear assembly module as claimed in claim 1, wherein the internal volume of the housing forms a continuous gas space, wherein three first busbar openings, three second busbar openings, and the three outgoing conductor openings each provide a separate entrance for each nominal conductor to the gas space from outside the housing.

22. The switchgear assembly module as claimed in claim 1, wherein the three second busbar openings are arranged areally in a third opening plane and along a third straight line, wherein the third opening plane is parallel to the first opening plane and the third straight line is parallel to the first straight line.

23. The switchgear assembly module as claimed in claim 22, wherein a respective isolating distance runs parallel to the first and/or third opening plane for each of the switch disconnectors.

24. The switchgear assembly module as claimed in claim 22, wherein a respective outgoing busbar connector extends along a respective busbar conductor section plane between each of the disconnection points and the respective busbar conductor section,
  wherein the busbar conductor section planes are arranged to run parallel to one another and are parallel to the first opening plane and the third opening plane and are arranged between said planes.

25. The switchgear assembly module as claimed in claim 16 wherein the housing of the switchgear assembly module comprises:
  three first busbar openings, in which first busbar openings of a respective one of the busbar conductor sections are accommodated separately, wherein the three first busbar openings are arranged areally in a first opening plane and along a first straight line;
  three second busbar openings, in which second busbar openings of a respective one of the busbar conductor sections are accommodated separately, wherein the three second busbar openings are arranged on a side of the housing which is opposite the three first busbar openings;
  wherein the three outgoing conductor openings are arranged areally in a second opening plane and along a second straight line, and wherein the three first busbar openings, the three second busbar openings, and the three outgoing conductor openings each form a separate entrance to the gas space from outside the housing.

26. The switchgear assembly module as claimed in claim 1, wherein each of the three second busbar openings is arranged in pairs with respect to a respective one of the three first busbar openings and with this opening forms a respective busbar opening pair, and a respective one of the busbar conductor sections is arranged continuously and along a straight line therebetween.

27. The switchgear assembly module as claimed in claim 1, wherein each of the three busbar conductor sections extends from a respective one of three first busbar connection openings to a respective one of three second busbar connection openings.

28. The switchgear assembly module as claimed in claim 1, wherein each of the three switch disconnectors switches an electrical contact between a respective one of the busbar conductor sections and a respective one of the outgoing conductor sections, and the three switch disconnectors are actuated by a common actuation system.

29. A substation, containing a switchgear assembly module as claimed in claim 1, wherein the busbar conductor sections form a longitudinal section of a busbar of the substation.

* * * * *